US008738854B2

(12) United States Patent
Iida

(10) Patent No.: US 8,738,854 B2
(45) Date of Patent: May 27, 2014

(54) STORAGE APPARATUS AND CONTROL METHOD OF STORAGE APPARATUS

(75) Inventor: Nobuhiro Iida, Odawara (JP)

(73) Assignee: Hitachi, Ltd., Tokyo (JP)

( * ) Notice: Subject to any disclaimer, the term of this patent is extended or adjusted under 35 U.S.C. 154(b) by 810 days.

(21) Appl. No.: 12/933,039

(22) PCT Filed: Sep. 3, 2010

(86) PCT No.: PCT/JP2010/005433
§ 371 (c)(1),
(2), (4) Date: Sep. 16, 2010

(87) PCT Pub. No.: WO2012/029095
PCT Pub. Date: Mar. 8, 2012

(65) Prior Publication Data
US 2012/0059990 A1   Mar. 8, 2012

(51) Int. Cl.
G06F 12/00 (2006.01)
G06F 13/00 (2006.01)

(52) U.S. Cl.
USPC ............ 711/114; 711/100; 711/112; 711/154

(58) Field of Classification Search
USPC .......................... 711/100, 112, 114, 154, 200
See application file for complete search history.

(56) References Cited

U.S. PATENT DOCUMENTS

| 6,909,695 | B2 * | 6/2005 | Lee et al. ....................... 370/238 |
| 7,694,092 | B2 * | 4/2010 | Mizuno .......................... 711/162 |

| 2008/0276061 | A1 | 11/2008 | Takaoka |
| 2008/0320220 | A1 | 12/2008 | Tsuboki et al. |
| 2009/0031167 | A1 | 1/2009 | Onabe et al. |
| 2009/0199042 | A1 | 8/2009 | Ishikawa et al. |
| 2009/0271645 | A1 | 10/2009 | Mori |
| 2010/0146208 | A1 | 6/2010 | Nashimoto et al. |
| 2012/0059990 | A1 * | 3/2012 | Iida ............................... 711/114 |

FOREIGN PATENT DOCUMENTS

| JP | 2003-006016 A | 1/2003 |
| JP | 2007-066067 A | 3/2007 |
| JP | 2007-087039 A | 4/2007 |
| JP | 2007-219877 A | 8/2007 |
| JP | 2009-026240 A | 2/2009 |

* cited by examiner

Primary Examiner — Tuan Thai
(74) Attorney, Agent, or Firm — Volpe and Koenig, P.C.

(57) ABSTRACT

A start time of recovery processing performed during a fall-back operation of the RAID can be flexibly controlled. A storage apparatus including an I/O processing unit that receives a data input/output request sent from an information processing device communicatively coupled to the I/O processing unit, and performs reading and writing of data from and to storage drives, includes: a priority storage unit that stores a priority set to each RAID group; a failure information storage unit that acquires and stores information on a failure occurred in the storage drives; a blockage processing unit that determines whether or not to block each of the storage drive based on the information on the failure, and blocks the storage drive that is determined to be blocked; a start time calculation unit that calculates a start time for starting recovery processing to delete a fall-back state of the RAID group to which the blocked storage drive belongs according to the priority set to the RAID group; and a recovery processing execution unit that starts the recovery processing at the start time.

13 Claims, 35 Drawing Sheets

Fig. 9

RAID GROUP INFORMATION MANAGEMENT TABLE 400

| RG# | RAID LEVEL | RAID CONFIGURATION | CONFIGURATION DISK | DRIVE TYPE | ASSOCIATED LU | PRIORITY | STATE |
|---|---|---|---|---|---|---|---|
| 0 | RAID5 | 4D+1P | 0,1,2,3,4 | SSD | 0,1,2 | 100 | NORMAL |
| 1 | RAID6 | 4D+2P | 6,7,8,9,10,11 | SAS | 3,4 | 100 | FALL BACK |
| 2 | RAID6 | 4D+2P | 12,13,14,15,16,17 | SAS | 5,6,7 | 50 | NORMAL |
| 3 | RAID1+0 | 3D+3D | 18,19,20,21,22,23 | SATA | 8,9 | 75 | NORMAL |
| 4 | RAID6 | 6D+2P | 24,25,26,27,28,29,30,31 | SAS | NONE | 30 | FALL BACK |
| 5 | RAID6 | 10D+2P | 32,33,34,35,36,37,38,39,40,41,42,43 | SAS | NONE | 40 | BLOCKED |

Fig. 10

Create RAID Group

RG# [ 2 ]  RG PRIORITY [ 50 ]
From 0 to 63  From 0 to 100

RAID Level [ RAID6 ▽ ]
Combination [ 4D+2P ▽ ]
Number of drives [ 6 ]
From 2 to max (based on drive count)

Drives  ● Automatic Selection

Drive Type [ SAS ▽ ]
Drive Capacity [ 300GB ▽ ]

○ Manual Selection

Assignable Drives

Raws/Page [ 25 ▽ ]   Page [ 1 ] of 16

| | Tray | HDU | Drive Type | Status |
|---|---|---|---|---|
| ☐ | 00 | 00 | SAS(300GB) | Out of RAID Group |
| ☐ | 00 | 01 | SAS(300GB) | Out of RAID Group |
| ☐ | 00 | 02 | SAS(300GB) | Out of RAID Group |
| ☐ | 00 | 03 | SAS(300GB) | Out of RAID Group |

[ Filter ]  [ Filter Off ]

[ OK ]  [ Cancel ]

[ Help ]

Fig. 11
(1) CALCULATION OF EXPECTED RG BLOCKAGE TIME
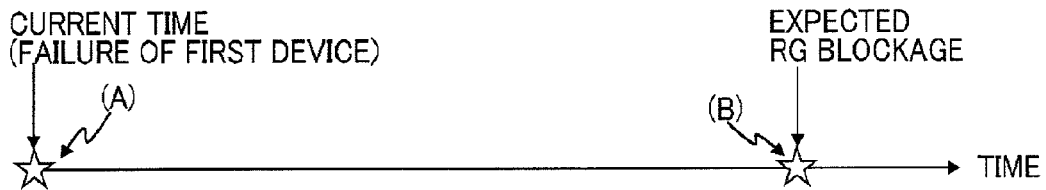
(2) CALCULATION OF LATEST RECOVERY PROCESSING START TIME CONSIDERING RECOVERY PROCESSING TIME
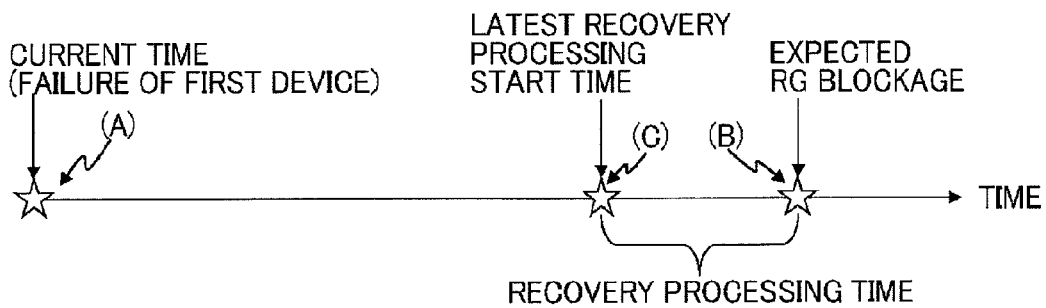
(3) CALCULATION OF RECOVERY PROCESSING START TIME CONSIDERING RG PRIORITY
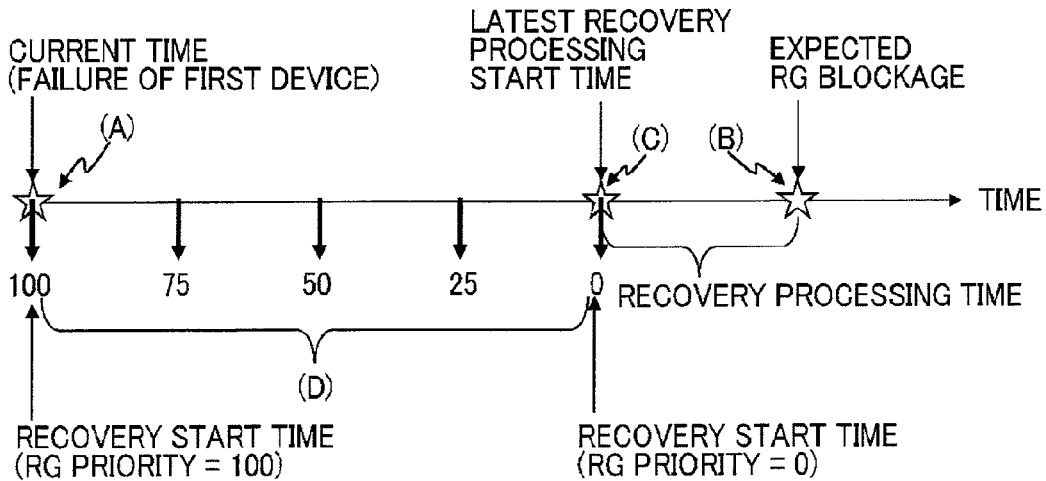

Fig. 12

DRIVE STATE MANAGEMENT TABLE  420

| DRIVE # | RG# | DRIVE TYPE | DRIVE ERROR COUNT ① | ② | ③ | ④ | ⑤ | ⑥ | ⑦ | ⑧ | DRIVE OPERATING TIME [MINUTES] | STATE |
|---|---|---|---|---|---|---|---|---|---|---|---|---|
| 0 | 0 | SAS | 2 | 2 | 2 | 2 | 1 | 1 | 0 | 1 | 1500 | NORMAL |
| 1 | 0 | SAS | 2 | 2 | 2 | 1 | 1 | 1 | 1 | 0 | 1500 | NORMAL |
| 2 | 0 | SAS | 2 | 2 | 2 | 2 | 1 | 1 | 0 | 1 | 1500 | NORMAL |
| 3 | 0 | SAS | 2 | 2 | 2 | 1 | 1 | 1 | 1 | 0 | 1500 | NORMAL |
| 4 | 0 | SAS | 2 | 2 | 2 | 2 | 1 | 1 | 0 | 1 | 1500 | NORMAL |
| 5 | 0 | SAS | 2 | 2 | 2 | 1 | 1 | 1 | 1 | 0 | 1500 | NORMAL |
| 6 | 1 | SATA | 6 | 6 | 6 | 6 | 4 | 4 | 0 | 0 | 1200 | NORMAL |
| 7 | 1 | SATA | 6 | 6 | 6 | 4 | 4 | 4 | 0 | 0 | 1200 | NORMAL |
| 8 | 1 | SATA | 6 | 6 | 6 | 6 | 4 | 4 | 0 | 0 | 1200 | NORMAL |
| 9 | 1 | SATA | 6 | 6 | 6 | 4 | 4 | 4 | 0 | 0 | 1200 | NORMAL |
| 10 | 1 | SATA | 6 | 6 | 6 | 6 | 4 | 4 | 0 | 0 | 1200 | NORMAL |
| 11 | 1 | SATA | 6 | 6 | 6 | 4 | 4 | 4 | 0 | 0 | 1200 | NORMAL |
| 12 | 2 | SSD | 1 | 1 | 0 | 0 | 0 | 0 | 0 | 0 | 600 | NORMAL |
| 13 | 2 | SSD | 1 | 1 | 0 | 0 | 0 | 0 | 0 | 0 | 600 | NORMAL |
| ... | ... | ... | ... | ... | ... | ... | ... | ... | ... | ... | ... | ... |
| 478 | 15 | SAS | 2 | 2 | 2 | 2 | 1 | 1 | 0 | 1 | 200 | NORMAL |
| 479 | 15 | SAS | 2 | 2 | 2 | 2 | 1 | 1 | 0 | 1 | 200 | NORMAL |

①MECHANICAL ERROR
②READ/WRITE ERROR
③DRIVE I/F ERROR
④HARDWARE ERROR
⑤REASSIGN/REWRITE ERROR
⑥DRIVE CHECK CODE ERROR
⑦LA/LRC ERROR
⑧DATA TRANSFER TIMEOUT

Fig. 13

DRIVE TYPE THRESHOLD MANAGEMENT TABLE      410

| DRIVE TYPE | ERROR THRESHOLD | | | | | | | |
|---|---|---|---|---|---|---|---|---|
| | ① MECHANICAL ERROR | ② READ/ WRITE ERROR | ③ DRIVE I/F ERROR | ④ HARDWARE ERROR | ⑤ REASSIGN/ REWRITE ERROR | ⑥ DRIVE CHECK CODE ERROR | ⑦ LA/LRC ERROR | ⑧ DATA TRANSFER TIMEOUT |
| SAS | 50 | 10 | 50 | 50 | 25 | 5 | 2 | 10 |
| SATA | 50 | 10 | 50 | 50 | 50 | 5 | 2 | 10 |
| SSD | 50 | 10 | 50 | 50 | 25 | 5 | 2 | 10 |

Fig. 14

RECOVERY PROCESSING TIME MANAGEMENT TABLE  430

| No. | RAID LEVEL | NUMBER OF REMAINING NORMAL DRIVES IN RG | RECOVERY PROCESSING TIME | | | | |
|---|---|---|---|---|---|---|---|
| | | | SAS146G | | ... | SATA2TB | |
| | | | CORRECTION COPY | COPY BACK | ... | CORRECTION COPY | COPY BACK |
| 1 | RAID1+0 | -- | XXXX MINUTES | XXXX MINUTES | ... | XXXX MINUTES | XXXX MINUTES |
| 2 | RAID5 | 14 | XXXX MINUTES | XXXX MINUTES | ... | XXXX MINUTES | XXXX MINUTES |
| 3 | | 13 | XXXX MINUTES | XXXX MINUTES | ... | XXXX MINUTES | XXXX MINUTES |
| 4 | | 12 | XXXX MINUTES | XXXX MINUTES | ... | XXXX MINUTES | XXXX MINUTES |
| 5 | | 11 | XXXX MINUTES | XXXX MINUTES | ... | XXXX MINUTES | XXXX MINUTES |
| 6 | | 10 | XXXX MINUTES | XXXX MINUTES | ... | XXXX MINUTES | XXXX MINUTES |
| ... | | ... | ... | ... | ... | ... | ... |
| | | 3 | XXXX MINUTES | XXXX MINUTES | ... | XXXX MINUTES | XXXX MINUTES |
| | | 2 | XXXX MINUTES | XXXX MINUTES | ... | XXXX MINUTES | XXXX MINUTES |
| | | 1 | XXXX MINUTES | XXXX MINUTES | ... | XXXX MINUTES | XXXX MINUTES |
| | RAID6 | 29 | XXXX MINUTES | XXXX MINUTES | ... | XXXX MINUTES | XXXX MINUTES |
| | | 28 | XXXX MINUTES | XXXX MINUTES | ... | XXXX MINUTES | XXXX MINUTES |
| | | 27 | XXXX MINUTES | XXXX MINUTES | ... | XXXX MINUTES | XXXX MINUTES |
| | | 26 | XXXX MINUTES | XXXX MINUTES | ... | XXXX MINUTES | XXXX MINUTES |
| | | 25 | XXXX MINUTES | XXXX MINUTES | ... | XXXX MINUTES | XXXX MINUTES |
| | | 24 | XXXX MINUTES | XXXX MINUTES | ... | XXXX MINUTES | XXXX MINUTES |
| | | 23 | XXXX MINUTES | XXXX MINUTES | ... | XXXX MINUTES | XXXX MINUTES |
| | | ... | ... | ... | ... | ... | ... |
| | | 6 | XXXX MINUTES | XXXX MINUTES | ... | XXXX MINUTES | XXXX MINUTES |
| | | 5 | XXXX MINUTES | XXXX MINUTES | ... | XXXX MINUTES | XXXX MINUTES |
| | | 4 | XXXX MINUTES | XXXX MINUTES | ... | XXXX MINUTES | XXXX MINUTES |
| | | 3 | XXXX MINUTES | XXXX MINUTES | ... | XXXX MINUTES | XXXX MINUTES |
| | | 2 | XXXX MINUTES | XXXX MINUTES | ... | XXXX MINUTES | XXXX MINUTES |

Fig. 15

RECOVERY PROCESSING SCHEDULING TABLE                                440

| RECOVERY PROCESSING ORDER | DRIVE # | RG# | EXPECTED RECOVERY START TIME |
|---|---|---|---|
| 1 | 3 | 0 | 201X YEAR XX MONTH XX DATE XX HOUR XX MINUTE |
| 2 | 4 | 0 | 201X YEAR XX MONTH XX DATE XX HOUR XX MINUTE |
| 3 | 6 | 1 | 201X YEAR XX MONTH XX DATE XX HOUR XX MINUTE |
| 4 | 15 | 2 | 201X YEAR XX MONTH XX DATE XX HOUR XX MINUTE |
| 5 | 23 | 3 | 201X YEAR XX MONTH XX DATE XX HOUR XX MINUTE |
| ... | | | |

Fig. 16

RAID Groups

Rows/Page: 25 ▼ | Page 1 of 1

| HDD | RAID Group | RAID Level | Capacity Total | Capacity Free | Drive Type | RG PRIORITY | SCHEDULED RECOVERY START TIME |
|---|---|---|---|---|---|---|---|
| 000 | ■000 | RAID5(15D+1P) | 500.0GB | 250.0GB | SAS | 100 | RECOVERY IN PROCESS |
| 015 | ■001 | RAID5(15D+1P) | 500.0GB | 250.0GB | SAS | 90 | 2010/07/30 12:50 |
| 032 | ■002 | RAID5(15D+1P) | 500.0GB | 250.0GB | SATA | 75 | 2010/07/30 16:00 |
| 049 | ■003 | RAID5(15D+1P) | 500.0GB | 250.0GB | SATA | 50 | 2010/07/30 18:45 |

[Create RG] [Delete RG] [Expand RG] [Change Priority] [Remove Expansion] [Filter] [Filter Off]

Fig. 22

TABLE: INFORMATION OBTAINABLE FROM FAILED DRIVE (4)

| ERROR TYPE | ERROR COUNT WHEN FAILURE OCCURED | ERROR THRESHOLD | RELEVANT DRIVE OPERATING TIME | TIME REQUIRED FOR INCREMENTING ERROR COUNT BY ONE |
|---|---|---|---|---|
| ERROR1 | 20 | 100 | XXXXX MINUTES | AA MINUTES |
| ERROR2 | 50 | 50 | | BB MINUTES |
| ERROR3 | 15 | 30 | | CC MINUTES |
| ERROR4 | 10 | 50 | | DD MINUTES |

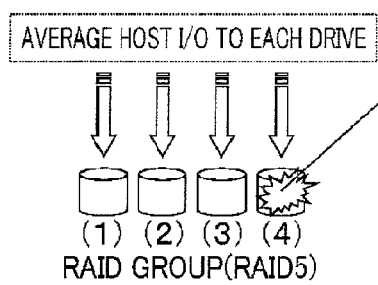

AVERAGE HOST I/O TO EACH DRIVE (1) (2) (3) (4)
RAID GROUP(RAID5)

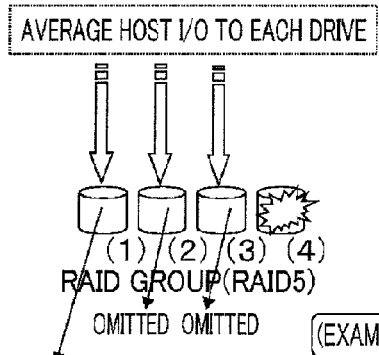

AVERAGE HOST I/O TO EACH DRIVE (1) (2) (3) (4)
RAID GROUP(RAID5)
OMITTED OMITTED (EXAMPLE: DRIVE (1))

TABLE: ESTIMATED FAILURE TIME OF EACH REMAINING NORMAL DRIVE

| ERROR TYPE | ERROR COUNT WHEN FAILURE OCCURS | ERROR THRESHOLD | TIME REQUIRED FOR INCREMENTING ERROR COUNT BY ONE (RELEVANT DRIVE): ① | TIME REQUIRED FOR INCREMENTING ERROR COUNT BY ONE (FAILED DRIVE): ② | SMALLER VALUE OF ①AND ② × 3/4 | EXPECTED TIME OF ATTAINING THRESHOLD |
|---|---|---|---|---|---|---|
| ERROR1 | 2 | 100 | EE MINUTES | AA MINUTES | II MINUTES | MMMM MINUTES LATER |
| ERROR2 | 4 | 50 | FF MINUTES | BB MINUTES | JJ MINUTES | NNNN MINUTES LATER |
| ERROR3 | 20 | 30 | GG MINUTES | CC MINUTES | KK MINUTES | OOOO MINUTES LATER |
| ERROR4 | 14 | 50 | HH MINUTES | DD MINUTES | LL MINUTES | PPPP MINUTES LATER |

Fig. 28

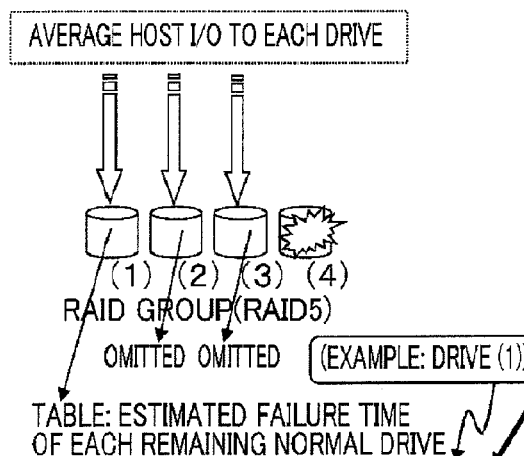

TABLE: INFORMATION OBTAINED FROM FAILED DRIVE (4)

| ERROR TYPE | ERROR COUNT WHEN FAILURE OCCURED | ERROR THRESHOLD | RELEVANT DRIVE OPERATING TIME | TIME REQUIRED FOR INCREMENTING ERROR COUNT BY ONE |
|---|---|---|---|---|
| ERROR1 | 20 | 100 | XXXXXX MINUTES | AA MINUTES |
| ERROR2 | 50 | 50 | | BB MINUTES |
| ERROR3 | 15 | 30 | | CC MINUTES |
| ERROR4 | 10 | 50 | | DD MINUTES |

(EXAMPLE: DRIVE (1))

TABLE: ESTIMATED FAILURE TIME OF EACH REMAINING NORMAL DRIVE

| ERROR TYPE | ERROR COUNT WHEN FAILURE OCCURS | ERROR THRESHOLD | TIME REQUIRED FOR INCREMENTING ERROR COUNT BY ONE (FAILED DRIVE): ② | ② × 3/4 | EXPECTED TIME OF ATTAINING THRESHOLD |
|---|---|---|---|---|---|
| ERROR1 | 2 | 100 | AA MINUTES | IIII MINUTES | UUUU MINUTES LATER |
| ERROR2 | 4 | 50 | BB MINUTES | JJJJ MINUTES | VVVV MINUTES LATER |
| ERROR3 | 20 | 30 | CC MINUTES | KKKK MINUTES | WWWW MINUTES LATER |
| ERROR4 | 14 | 50 | DD MINUTES | LLLL MINUTES | YYYY MINUTES LATER |

Fig. 36

EXAMPLE: DRIVE #1 IN RG #0 REACHES ① THRESHOLD
(OF MECHANICAL ERROR) IN 2000 MINUTES OF OPERATION

RAID GROUP INFORMATION MANAGEMENT TABLE  400

| RG# | RAID LEVEL | RAID CONFIGURATION | CONFIGURATION DISK | DRIVE TYPE | ASSOCIATED LU | PRIORITY | STATE |
|---|---|---|---|---|---|---|---|
| 0 | RAID5 | 2D+1P | 0,1,2 | SAS | 0,1,2 | 20 | FALL BACK |
| 1 | RAID5 | 2D+1P | 3,4,5 | SAS | 3,4 | 80 | NORMAL |

DRIVE STATE MANAGEMENT TABLE  420

| DRIVE # | RG# | DRIVE TYPE | DRIVE ERROR COUNT ① | ② | ③ | ④ | ⑤ | ⑥ | ⑦ | ⑧ | DRIVE OPERATING TIME [MINUTES] | STATE |
|---|---|---|---|---|---|---|---|---|---|---|---|---|
| 0 | 0 | SAS146G | 40 | 2 | 10 | 10 | 0 | 0 | 0 | 0 | 2000 | NORMAL |
| 1 | 0 | SAS146G | 50 | 2 | 10 | 10 | 0 | 0 | 0 | 0 | 2000 | FALL BACK |
| 2 | 0 | SAS146G | 20 | 2 | 10 | 10 | 0 | 0 | 0 | 0 | 2000 | NORMAL |
| 3 | 1 | SAS300G | 2 | 2 | 2 | 1 | 1 | 1 | 1 | 0 | 1000 | NORMAL |
| 4 | 1 | SAS300G | 2 | 2 | 2 | 2 | 1 | 1 | 0 | 1 | 1000 | NORMAL |
| 5 | 1 | SAS300G | 2 | 2 | 2 | 1 | 1 | 1 | 1 | 0 | 1000 | NORMAL |

DRIVE TYPE THRESHOLD MANAGEMENT TABLE  410

| DRIVE TYPE | ERROR THRESHOLD | | | | | | | |
|---|---|---|---|---|---|---|---|---|
|  | ① MECHANICAL ERROR | ② READ/WRITE ERROR | ③ DRIVE I/F ERROR | ④ HARDWARE ERROR | ⑤ REASSIGN/REWRITE ERROR | ⑥ DRIVE CHECK CODE ERROR | ⑦ LA/LRC ERROR | ⑧ DATA TRANSFER TIMEOUT |
| SAS | 50 | 10 | 50 | 50 | 25 | 5 | 2 | 10 |

RECOVERY PROCESSING TIME MANAGEMENT TABLE

| # | RAID LEVEL | NUMBER OF REMAINING NORMAL DRIVES IN RG | RECOVERY PROCESSING TIME | | | | |
|---|---|---|---|---|---|---|---|
|  |  |  | SAS146G | | ... | SATA2TB | |
|  |  |  | CORRECTION COPY | COPY BACK | ... | CORRECTION COPY | COPY BACK |
|  | RAID5 | 2 | 20 MINUTES | XXXX MINUTES | ... | XXXX MINUTES | XXXX MINUTES |
|  |  | 1 | XXXX MINUTES | XXXX MINUTES | ... | XXXX MINUTES | XXXX MINUTES |

TIME FLOW

| EVENT OCCURRED | RECOVERY PROCESSING | HOST I/O PERFORMANCE |
|---|---|---|
| HDD FAILURE IN RG 0 → | CORRECTION COPY STARTED | REDUCED |
| HDD FAILURE IN RG 1 | (CORRECTION COPY IN OPERATION) | REDUCED |
| HDD FAILURE IN RG 2 | CORRECTION COPY COMPLETED | REDUCED |
|  | CORRECTION COPY STARTED | REDUCED |
|  | (CORRECTION COPY IN OPERATION) | REDUCED |
|  | CORRECTION COPY COMPLETED | REDUCED |
|  | CORRECTION COPY STARTED | REDUCED |
|  | (CORRECTION COPY IN OPERATION) | REDUCED |
|  | CORRECTION COPY COMPLETED | REDUCED |

STORAGE APPARATUS AND CONTROL METHOD OF STORAGE APPARATUS

TECHNICAL FIELD

The present invention relates to a storage apparatus and a control method thereof, and more particularly, to a technology for enabling flexible control of start time of recovery processing during a fall-back operation of redundant arrays of inexpensive disks (RAID).

BACKGROUND ART

In recent years, RAID has been used to improve reliability and fault tolerance in many storage apparatuses. In a storage apparatus using RAID, even if any of the storage drives configuring a RAID group is blocked due to a failure or the like, reading data or writing data can be continued by a fall-back operation using the remaining storage drives.

For such storage apparatuses, a technology has been developed which recovers the data stored in a blocked storage drive by using the data stored in a non-blocked storage drive in the same RAID group as the blocked storage drive during the fall-back operation, and writes the data to a storage drive prepared as a spare drive (hereinafter, also referred to as correction copy). Also another technology has been developed which writes the data recovered in the spare drive by the correction copy back to a new storage drive after the blocked storage drive is replaced with the new storage drive (hereinafter, also referred to as copy back) (for example, refer to Patent Documents 1, 2, and 3).

Also another technology has been developed which assigns priorities to the respective volumes created and allocated in the storage apparatus, and transmits copies of the data stored in the volumes to a storage apparatus installed at a remote site for disaster recovery or the like, in such order that the volumes with higher priorities can be transmitted prior to the remaining volumes (for example, refer to Patent Documents 4 and 5).

CITATION LIST

Patent Literature

[PTL 1]
Japanese Patent Application Laid-open Publication No. 2007-087039
[PTL 2]
Japanese Patent Application Laid-open Publication No. 2007-219877
[PTL 3]
Japanese Patent Application Laid-open Publication No. 2009-026240
[PTL 4]
Japanese Patent Application Laid-open Publication No. 2003-006016
[PTL 5]
Japanese Patent Application Laid-open Publication No. 2007-066067

SUMMARY OF INVENTION

Technical Problem

Recovery processing such as correction copy or copy back is started when a storage drive is blocked and the RAID initiates a fall-back operation.

When storage drive failure occurs in a plurality of RAID groups as shown in FIGS. 38 and 39, recovery processing for a subsequent RAID group is started after the recovery processing for the RAID group which has entered the fall-back operation earlier is completed to suppress the increase of load on the storage apparatus due to recovery processing.

However, the RAID groups are different from each other in terms of a RAID level assigned to a RAID group, use of data stored in a RAID group, and the like. Thus, recovery processing of a RAID group may need not be started immediately in some cases even if a storage drive in a certain RAID group is blocked.

Thus, there is a desire for a technology that enables a user, an operation administrator or other personnel of the storage to flexibly control a start time of the recovery processing when a storage drive in a RAID group is blocked.

The present invention has been made in view of such a background, and it is an object of the invention to provide a storage apparatus and a control method of a storage apparatus that enable flexible control of a start time of recovery processing performed during a fall-back operation of the RAID.

Solution to Problems

An aspect of the present invention to achieve the above object is a storage apparatus that includes an I/O processing unit that receives a data input/output request sent from an information processing device communicatively coupled thereto, and performs reading and writing of data from and to a storage drive; a priority storage unit that stores a priority set to each RAID group including the storage drive; a failure information storage unit that acquires and stores information on a failure occurred in the storage drive; a blockage processing unit that determines whether or not the storage drive is to be blocked based on the information on the failure, and blocks the storage drive that is determined to be blocked; a start time calculation unit that calculates a start time for recovery processing to delete a fall-back state of the RAID group to which the blocked storage drive belongs according to the priority set to the RAID group; and a recovery processing execution unit that starts the recovery processing at the start time.

Other problems and solutions thereto disclosed herein will become apparent from the description in the Description of Embodiments with reference to the drawings.

Advantageous Effects of Invention

According to the present invention, start time of recovery processing performed during a fall-back operation of the RAID can be flexibly controlled.

BRIEF DESCRIPTION OF DRAWINGS

FIG. 9 is a diagram showing a RAID group information management table of the present embodiment.

FIG. 10 is a diagram showing an example of a screen displayed on the management PC of the present embodiment.

FIG. 11 is a diagram for illustrating calculation processing of a recovery start time of the present embodiment.

FIG. 12 is a diagram showing a drive state management table of the present embodiment.

FIG. 13 is a diagram showing a drive type threshold management table of the present embodiment.

FIG. 14 is a diagram showing a recovery processing time management table of the present embodiment.

FIG. 15 is a diagram showing a recovery processing scheduling table of the present embodiment.

FIG. 16 is a diagram showing an example of a screen displayed on the management PC of the present embodiment.

FIG. 22 is a diagram showing an example of an expected RAID group block time calculation method of the present embodiment.

FIG. 28 is a diagram showing an example of an expected RAID group block time calculation method of the present embodiment.

FIG. 36 is a diagram showing a specific example of recovery processing time calculation processing of the present embodiment.

FIG. 39 is a diagram showing how recovery processing is sequentially performed on a plurality of RAID groups.

DESCRIPTION OF EMBODIMENTS

In the following, embodiments are described in conjunction with the drawings.

==Entire Configuration==

Figure 1:
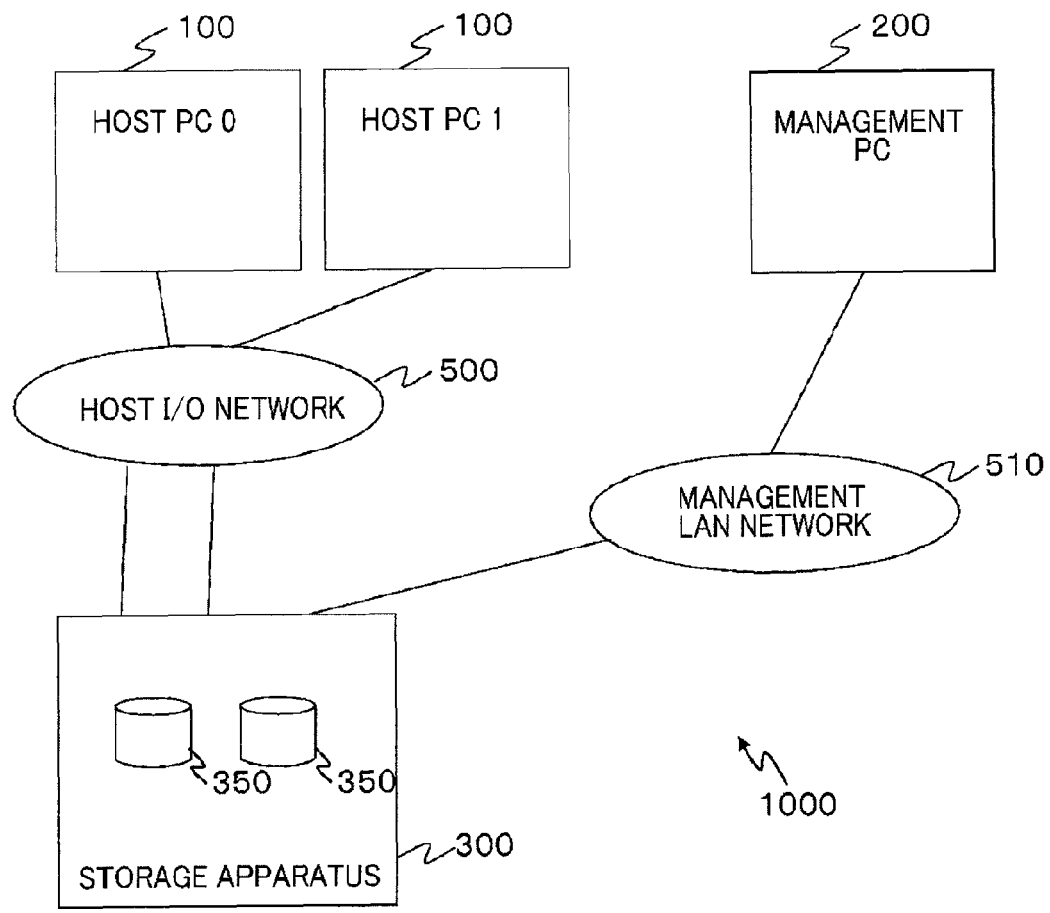
FIG. 1 is a diagram showing a configuration of a storage system of the present embodiment.

FIG. 1 shows a schematic configuration of a storage system 1000 of the present embodiment. As shown in FIG. 1, the storage system 1000 is configured to include one or more host PCs (Personal Computers) 100, a storage apparatus 300, and a management PC 200.

The host PC 100 corresponds to an information processing device described in Scope of Claims. Also, the management PC 200 corresponds to a management terminal described in the Claims.

The host PC 100 is, for example, a computer which provides a service such as an automated teller service of a bank, or a Web page browsing service on the Internet. The storage apparatus 300 provides a data storage area to an application program or the like executed in the host PC 100.

The management PC 200 is a computer that maintains and manages the storage apparatus 300. An operator can, for example, change a RAID (e.g., from RAID1 to RAID5) configured with a plurality of storage drives 350 in the storage apparatus 300 or can add or remove the storage drives 350 by operating the management PC 200. These settings or controls can be performed by a user interface provided in the management PC 200.

The host PC 100 and the storage apparatus 300 are communicatively coupled to each other via a host I/O network 500. The host I/O network 500 is, for example, a LAN (Local Area Network), a WAN (Wide Area Network), a SAN (Storage Area Network), the Internet, a public communication network, a private line, and the like. Communication via the host I/O network 500 is performed in accordance with a protocol of, for example, TCP/IP, iSCSI (internet Small Computer System Interface), a Fibre Channel Protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

The host PC 100 is, for example, a personal computer, a Mainframe, an office computer, and the like. The host PC 100 transmits a data frame (hereinafter abbreviated as a frame) including a data I/O request (such as a data write request, or a data read request) to the storage apparatus 300 when accessing the storage area provided by the storage apparatus 300. The frame is, for example, a Fibre Channel frame (FC frame).

The management PC 200 and the storage apparatus 300 are communicatively coupled to each other via a management LAN network 510. The management LAN network 510 is, for example, a LAN, a WAN, the Internet, a public communication network, a private line, and the like.

==Storage Apparatus==

Figure 2:
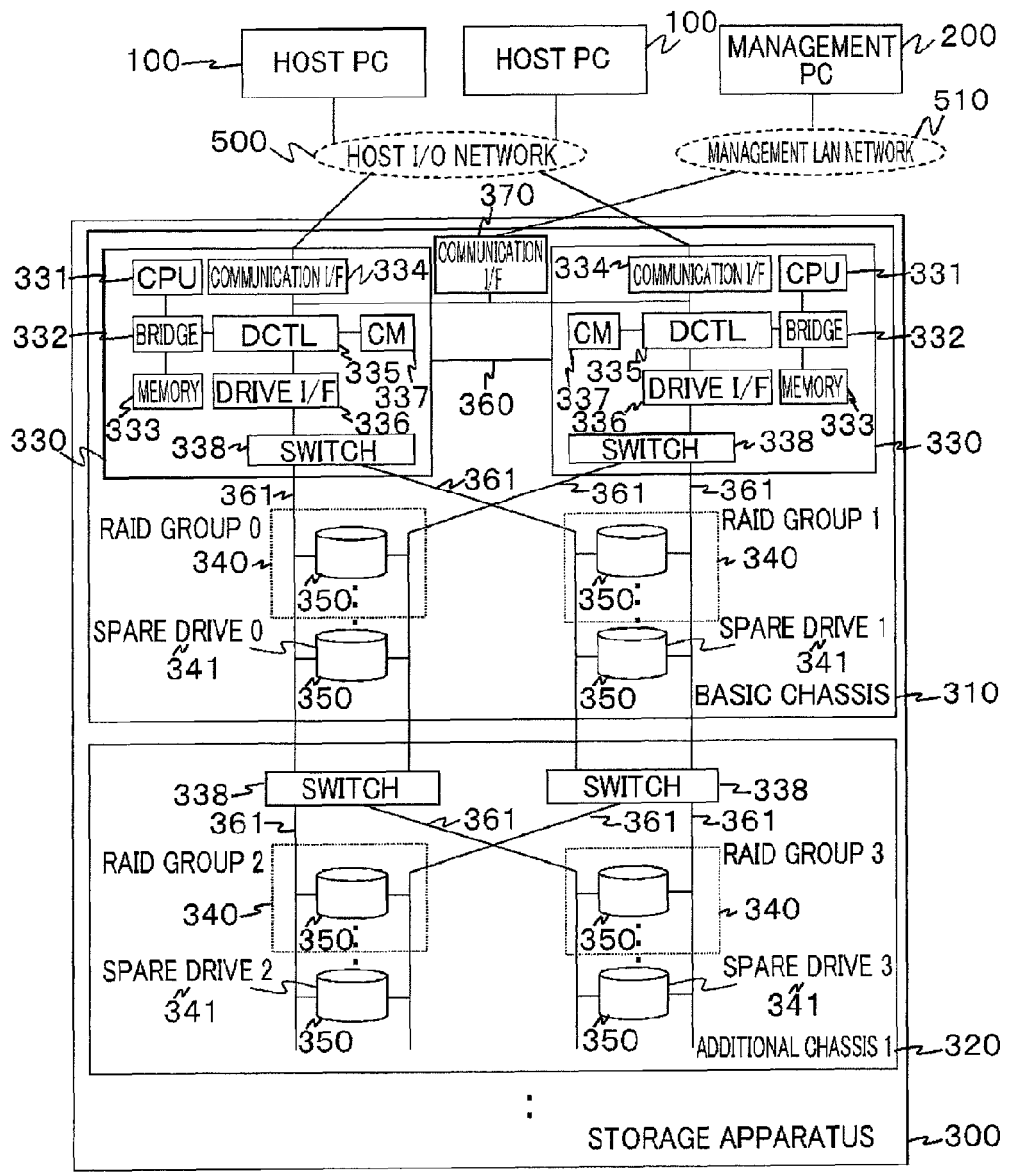
FIG. 2 is a diagram showing a configuration of a storage apparatus of the present embodiment.

FIG. 2 shows a hardware configuration of the storage apparatus 300. As shown in FIG. 2, the storage device 300 includes: a basic chassis 310 in which a plurality of circuit boards 330 are implemented which are configured in a redundant manner for the purpose of improving reliability, of distributing the load; and an additional chassis 320 having no circuit board 330.

The basic chassis 310 includes control substrates 330, a communication I/F 370, and storage drives 350.

The communication I/F 370 is an interface for the storage apparatus 300 to communicate with the management PC 200.

The control substrates 330 each include a communication I/F 334, a data controller (DCTL) 335, a drive I/F 336, a cache memory (CM) 337, a bridge 332, a CPU (Central Processing Unit) 331, a memory 333, and a switch 338. The control substrates 330 configured in a redundant manner are communicatively coupled to each other via an internal bus 360 compliant with a standard such as the PCI (Peripheral Component Interconnect) express.

The storage drive 350 is a hard disk drive or a semiconductor storage device (SSD: Solid State Drive) compliant with a standard such as SAS (Serial Attached SCSI), SATA (Serial ATA), FC (Fibre Channel), PATA (Parallel ATA), SCSI (Small Computer System Interface), and the like.

The storage drive 350 is coupled to the control substrate 330 via fiber channel loops 361.

RAID groups 340 are configured to include these plurality of storage drives 350. Furthermore, the storage drive 350 not included in the RAID group 340 is also used as a spare drive 341.

In each RAID group 340, logical volumes (hereinafter also denoted as a LU (Logical Unit)) are formed. An identifier that identifies an individual logical volume is also denoted as a LUN (Logical Unit Number). A LUN is set by, for example, a data input/output request sent from the host PC 100 to the storage apparatus 300.

The additional chassis 320 includes switches 338 and storage drives 350.

The storage drives 350 included in the additional chassis 320 are coupled to the control substrate 330 via fiber channel loops 361 as well as the storage drives 350 included in the basic chassis 310.

The switches 338 included in the additional chassis 320 couples the fiber channel loops 361 of the basic chassis 310 and the fiber channel loops 361 of the additional chassis 320.

The storage apparatus 300 according to the present embodiment is configured to include the storage drives 350, but may be configured not to include the storage drives 350. In this case, the storage apparatus 300 is communicatively coupled to a storage device (not shown) configured to include a plurality of storage drives 350 via a network such as a SAN or a LAN. And the storage apparatus 300 performs writing and reading of data to and from the above-mentioned storage drives 350 via the network.

Figure 3:
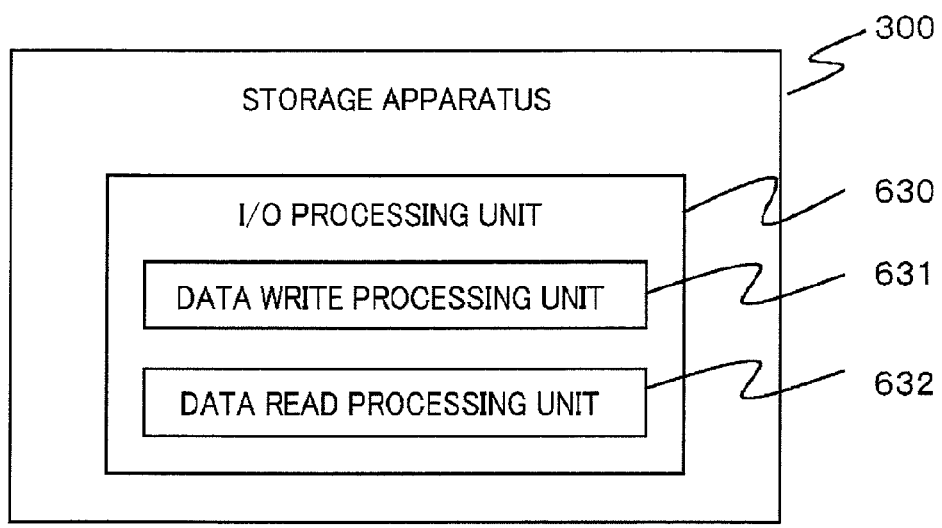
FIG. 3 is a diagram showing an I/O processing unit provided in the storage apparatus of the present embodiment.

FIG. 3 shows a functional block diagram related to the data write processing function and the data read processing function which the storage apparatus 300 has. As shown in FIG. 3, the storage apparatus 300 includes an I/O processing unit 630. The I/O processing unit 630 receives a data input/output request sent from the host PC 100, and performs reading and writing of data from and to the storage drives 350.

The I/O processing unit 630 unit 630 includes a data write processing unit 631 and a data read processing unit 632. The data write processing unit 631 performs processing related to writing of data to the storage drives 350. The data read processing unit 632 performs processing related to reading of data from the storage drives 350.

These functions that the storage apparatus 300 has, in addition to other functions described later are implemented by the hardware and the CPU 331 of the control substrate 330 reading a program (for example, BIOS (Basic Input Output System) a firmware, or an operating system) stored in the memory 333 or the storage drives 350 and executing the same.

Figure 4:
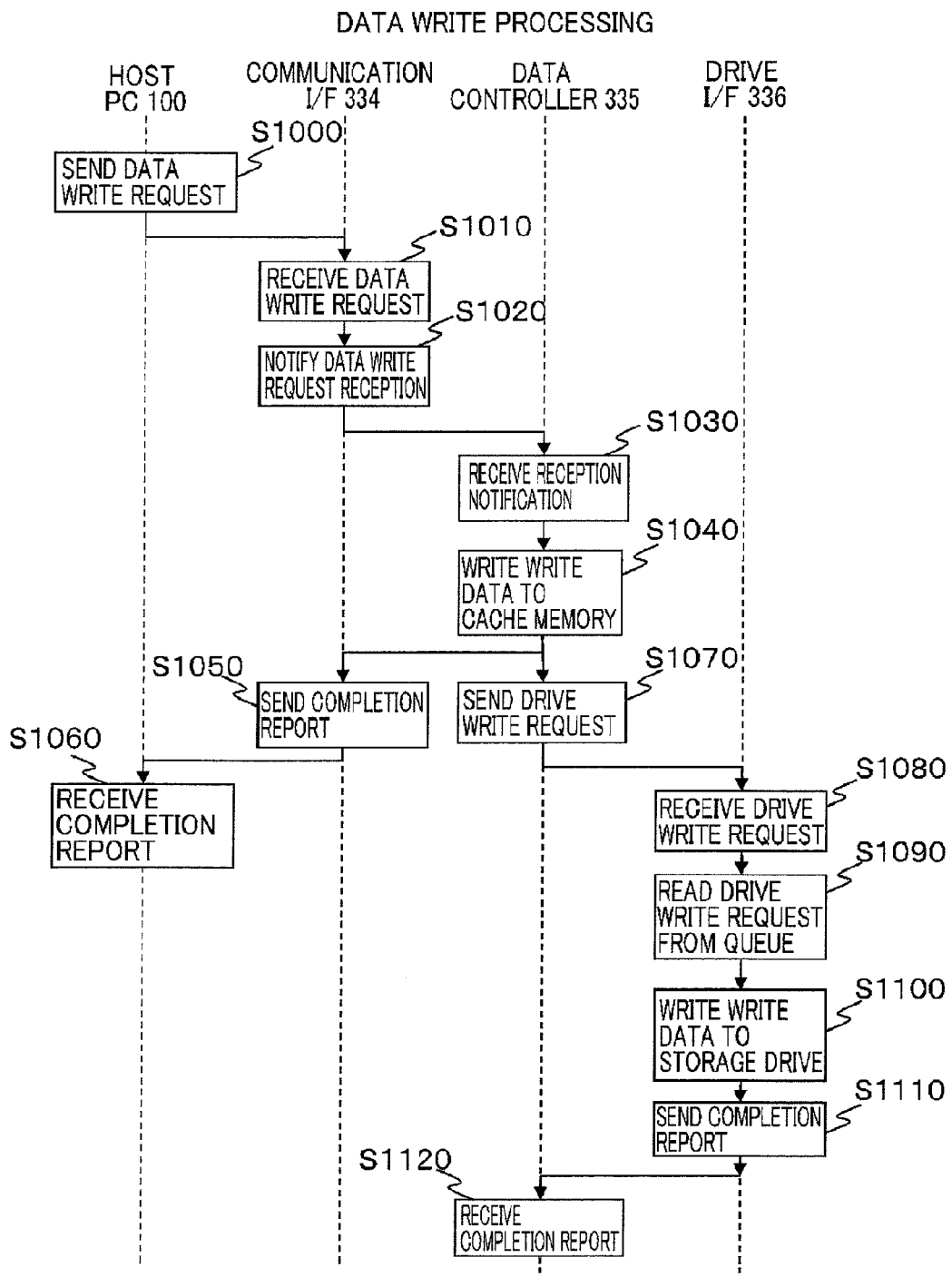
FIG. 4 is a flowchart showing a flow of data write processing of the present embodiment.

FIG. 4 is a flowchart illustrating a write processing performed by the data write processing unit 631 when the storage apparatus 300 receives a frame including a data write request from the host PC 100.

The communication I/F 334 of the storage apparatus 300 receives a data write request frame sent from the host PC 100 (S1000, S1010). Upon receipt of the frame, the communication I/F 334 notifies the data controller 335 of the receipt of the frame (S1020).

Upon receipt of the aforementioned notice from the communication I/F 334 (S1030), the data controller 335 generates a drive write request based on a data write request of the frame and then stores the write data in the cache memory 337 (S1040).

The data controller 335 sends a write completion report to the communication I/F 334. The communication I/F 334 sends a completion report to the host PC 100 (S1050), and the host PC 100 then receives the completion report (S1060).

Meanwhile, the data controller 335 sends the generated drive write request to the drive I/F 336 (S1070, S1080).

Upon receipt of the drive write request, the drive I/F 336 registers the received drive write request in a write processing queue. The drive I/F 336 reads out the drive write request from the write processing queue as needed (S1090). The drive I/F 336 reads write data specified in the read drive write request from the cache memory 337 and then writes the read write data into the storage drive 350 (S1100).

Next, the drive I/F 336 notifies the data controller 335 of a report (completion report) indicating that the writing of the write data for the drive write request is completed (S1110). The data controller 335 then receives the sent completion report (S1120).

Figure 5:
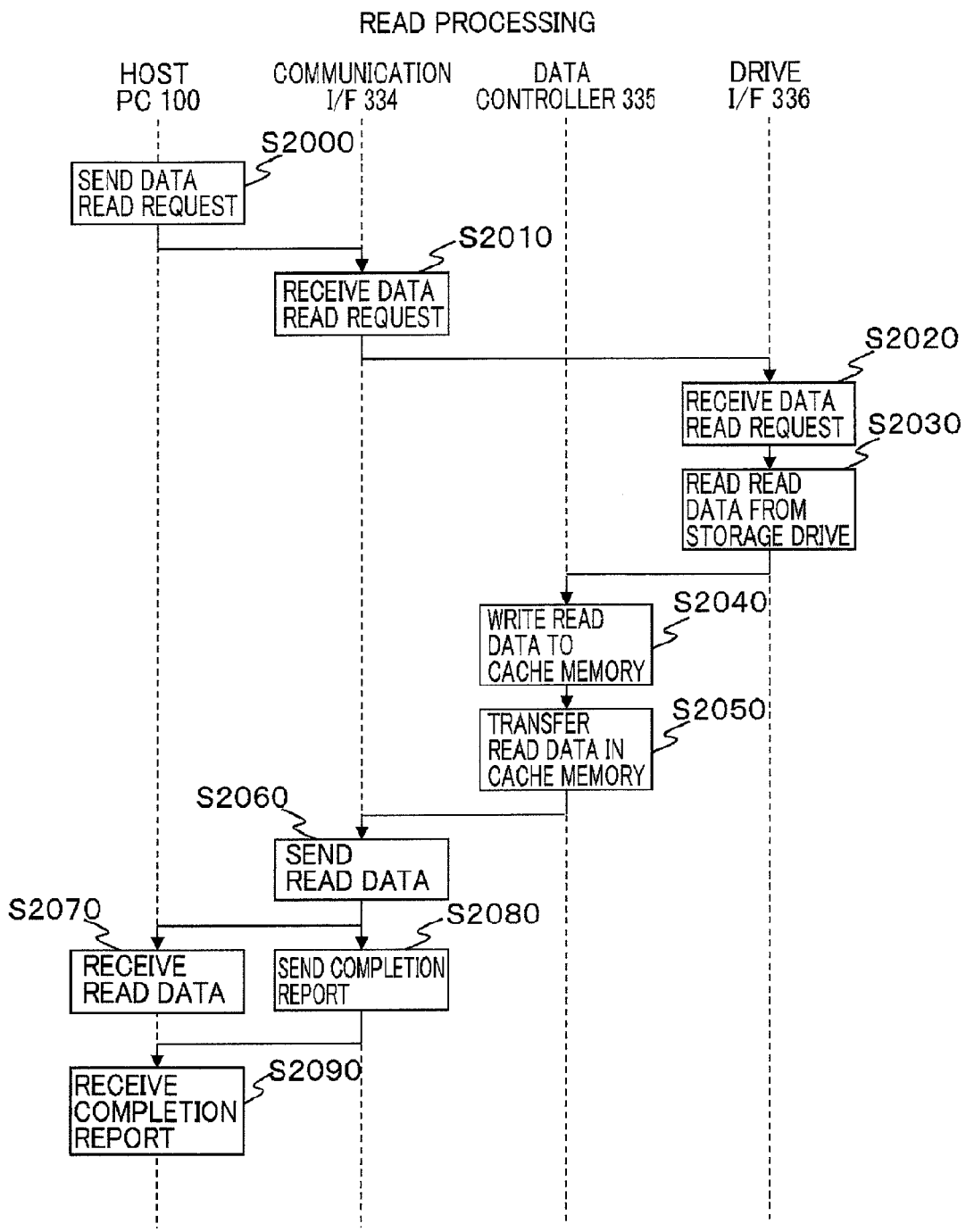
FIG. 5 is a flowchart showing a flow of data read processing of the present embodiment.

FIG. 5 is a flowchart illustrating the read processing performed by the data read processing unit 632 of the storage apparatus 300 when the storage apparatus 300 receives a frame including a data read request from the host PC 100.

The communication I/F 334 of the storage apparatus 300 receives a frame sent from the host PC 100 (S2000, S2010). Upon receipt of the frame from the host PC 100, the communication I/F 334 notifies the drive I/F 336 of the receipt of the frame.

Upon receipt of the aforementioned notice from the communication I/F 334 (S2020), the drive I/F 336 reads data specified in a data read request included in the frame (specified by an LBA (Logical Block Address), for example) from the storage drive 350 (S2030). Here, when the data to be read exists in the cache memory 337 (when the data to be read is cache hit), the read processing from the storage drive 350 (S2030) is omitted. The data controller 335 writes the data read by the drive I/F 336 into the cache memory 337 (S2040). The data controller 335 transfers the data written into the cache memory 337 to the communication I/F 334 as needed (S2050).

The communication I/F 334 sequentially sends the read data sent from the data controller 335 to the host PC 100 (S2060, S2070). Upon completion of sending the read data, the communication I/F 334 sends a completion report to the host PC 100 (S2080). The host PC 100 then receives the sent completion report (S2090).

==Host PC, Management PC==

Figure 6:
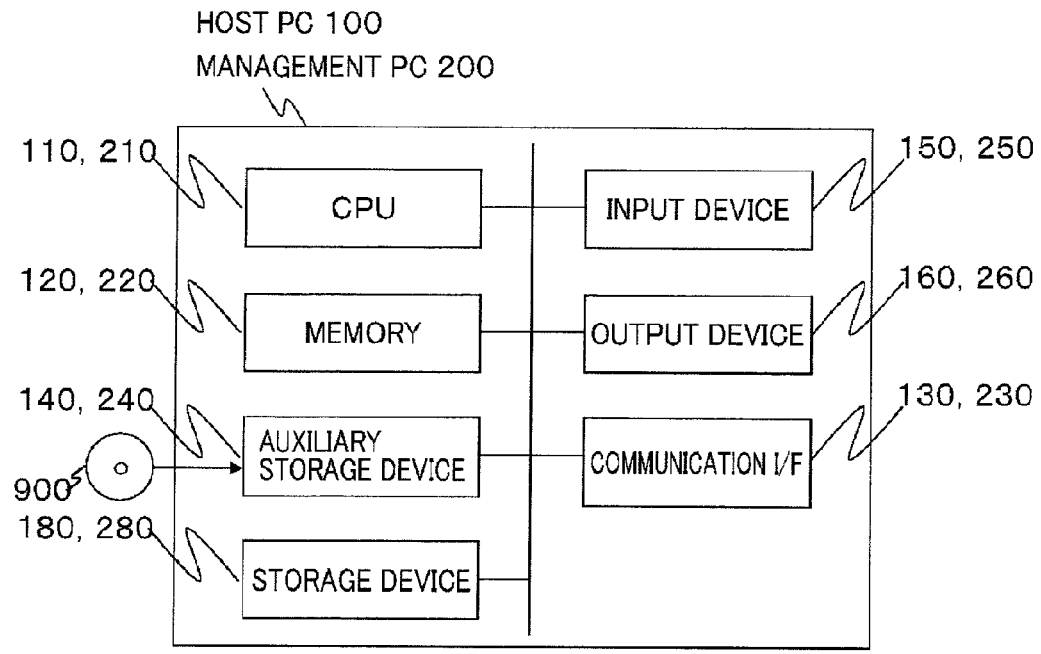
FIG. 6 is a diagram showing a configuration of a host PC and a management PC of the present embodiment.

FIG. 6 shows an example of hardware of an information processing device used as the host PC 100 or the management PC 200.

As shown in FIG. 6, the host PC 100 includes: a CPU 110; a volatile or non-volatile memory 120 (RAM or ROM); an auxiliary storage device 140 to perform reading and writing of data from and to a recording media 900 such as a flexible disk, CD, DVD, or an optical disc; a storage device 180 (for example, an HDD or a semiconductor storage device (SSD); an input device 150 such as a keyboard or a mouse; an output device 160 such as a liquid crystal display or a printer; and a communication interface (hereinafter referred to as a communication I/F 130) such as an NIC (Network Interface Card) or an HBA (Host Bus Adapter).

The management PC 200 includes: a CPU 210; a volatile or non-volatile memory 220 (RAM or ROM); an auxiliary storage device 240 to perform reading and writing of data from and to a recording media 900 such as a flexible disk, CD, DVD, or an optical disc; a storage device 280 (for example, an HDD or a semiconductor storage device (SSD); an input device 250 such as a keyboard or a mouse; an output device 260 such as a liquid crystal display or a printer; and a communication interface (hereinafter referred to as a communication I/F 230) such as an NIC or an HBA.

Figure 7:
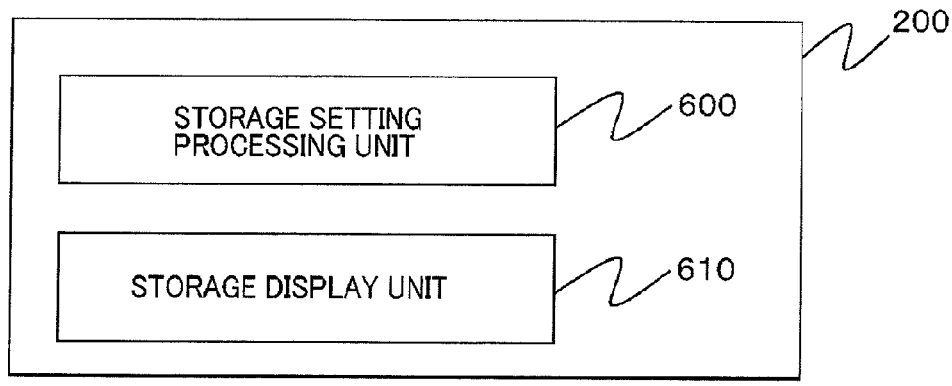
FIG. 7 is a diagram showing a configuration of the management PC of the present embodiment.

The management PC 200 includes a storage setting processing unit 600 and a storage display unit 610 as shown in FIG. 7. The storage setting processing unit 600 corresponds to a priority setting processing unit, and a priority transmitting unit described in the Claims.

The management PC 200 receives an input of various setting information to add or remove the storage drives 350, make various setting and changes and the like related to a RAID, and setting of the storage apparatus 300. Also, the management PC 200 sends these setting information to the storage apparatus 300.

The management PC 200 also receives various information such as setting details and failure occurrence conditions of the storage apparatus 300 from the storage apparatus 300 and displays the same.

In the recording medium 900, a program, data, or the like for implementing functions of the management PC 200 as well as a program, data, or the like for implementing functions of the storage apparatus 300 according to the present embodiment are recorded.

==Functions of the Storage Apparatus==

Figure 8:
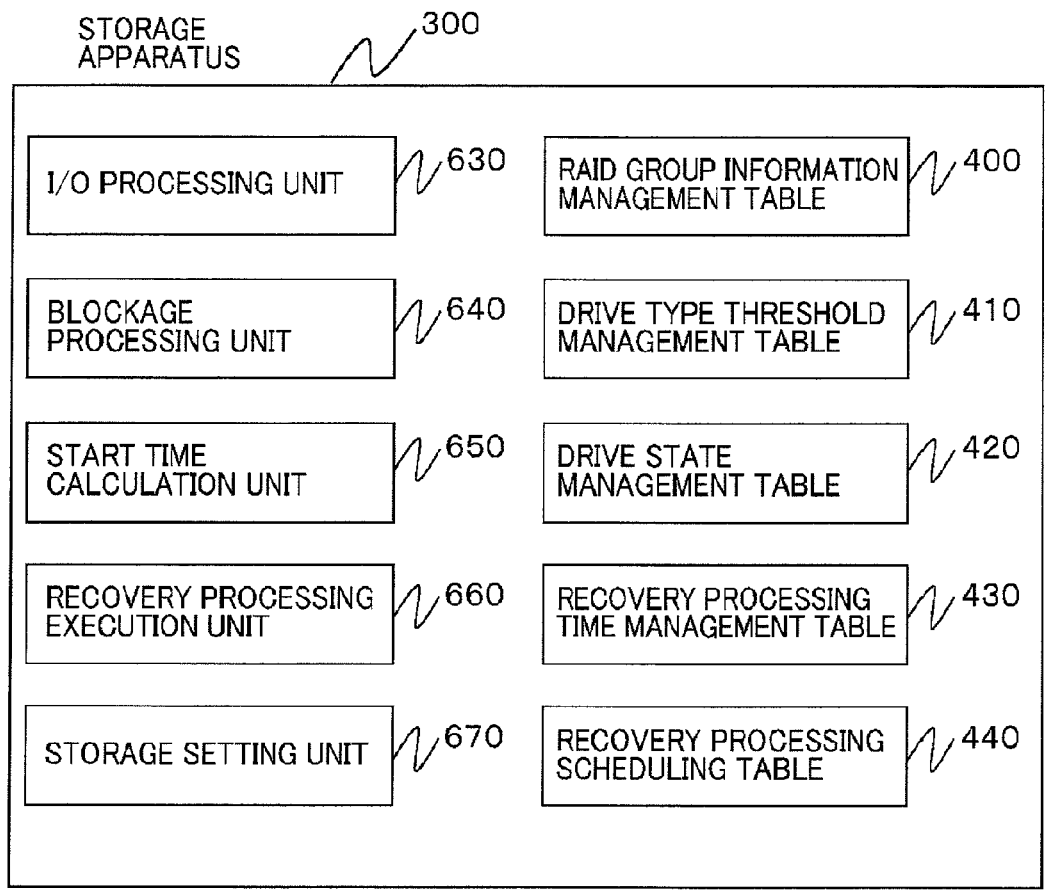
FIG. 8 is a diagram showing a configuration of the storage apparatus of the present embodiment.

Next, each function possessed by the storage apparatus 300 according to the present embodiment is described with reference to FIG. 8.

The storage apparatus 300 includes the I/O processing unit 630, a blockage processing unit 640, a start time calculation unit 650, a recovery processing execution unit 660, and a storage setting unit 670.

The storage apparatus 300 further includes a RAID group information management table 400, a drive type threshold management table 410, a drive state management table 420, a recovery processing time management table 430, and a recovery processing scheduling table 440.

The RAID group information management table 400, the drive type threshold management table 410, the drive state management table 420, the recovery processing time management table 430, and the recovery processing scheduling table 440 are stored in the memory 333 and the storage drive 350 included in the storage apparatus 300.

The storage setting unit 670 corresponds to the priority processing unit, and the priority receiving unit described in the Claims. The recovery processing execution unit 660 corresponds to a recovery process execution unit and a load acquisition unit in the Claims. The RAID group information management table 400 corresponds to the priority storage unit described in the Claims. The drive state management table 420 corresponds to the failure information storage unit, and the operating time storage unit described in the Claims. The recovery processing time management table 430 corresponds to the recovery processing time storage unit described in the Claims. And the recovery processing scheduling table 440 corresponds to the execution queue described in the Claims.

<Storage Setting Unit>

The storage setting unit 670 receives various setting information for the storage apparatus 300 transmitted from the management PC 200, and performs various settings for the storage apparatus 300 according to the setting information. The storage setting unit 670 records the setting information in the RAID group information management table 400 in the memory 333. The storage setting unit 670 controls the storage apparatus 300 according to the setting information.

For example, the storage setting unit 670 receives setting information for the RAID to be configured on the storage 300 using the storage drives 350 from the management PC 200, and records the setting information for the RAID in the RAID group information management table 400. The storage setting unit 670 controls the RAID according to the set details.

<RAID Group Information Management Table>

An example of setting information of the storage apparatus 300 recorded in the RAID group information management table 400 is shown in FIG. 9.

The RAID group information management table 400 has entries of "RAID group number" (identification information for RAID groups, hereinafter also denoted as a RG#), "RAID level", "RAID configuration", "configuration disk", "drive type", "associated LU", "priority", and "state."

Each information of the "RAID group number", "RAID level", "RAID configuration", "configuration disk", "drive type", "associated LU", and "priority" are set by inputs from an operator such as a maintenance personnel of the storage apparatus 300 using the input device 250 according to an input setting screen as shown in FIG. 10, displayed on the output device 260 included in the management PC 200.

A value used as a parameter to calculate a start time for the storage apparatus 300 to start recovery processing such as a correction copy or a copy back in the case where a storage drive 350 in the RAID group 340 is blocked and the RAID group 340 shifts to a fall-back operation is recorded in the "priority" entry. As described in detail later, according to the present embodiment, a priority can be set in a range from 0 to 100, and when a priority of 100 is set, the recovery processing is started immediately. Also, when a priority of 0 is set, the recovery processing is started at the time when the latest recovery processing start time described later has lapsed.

The state of each RAID group 340 is recorded in the "state" entry. The state of each RAID group 340 recorded in the "state" entry is any one of "normal", "fall-back", or "blocked." The blockage processing unit 640 determines whether the state of each RAID group 340 is "normal", "fall-back", or "blocked", and records the state in the "state" entry of the RAID group information management table 400.

"Normal" indicates a state in which reading and writing of data can be performed on all the storage drives 350 in the RAID group 340, and redundancy according to the RAID level of the RAID group 340 is maintained.

"Fall-back" indicates a state in which any one of the storage drives 350 in the RAID group 340 is blocked and the RAID group 340 has started a fall-back operation (a state with reduced redundancy, or a state without redundancy, also denoted simply as a fall-back state). In a RAID in fall-back operation, the data of the blocked storage drive 350 can be recovered from the data of non-blocked storage drives 350.

"Blocked" indicates a state in which a plurality of storage drives 350 in the RAID group 340 are blocked, and the data of the blocked storage drives 350 cannot be recovered from the data of non-blocked storage drives 350.

For example, in RAID5, even if one storage drive 350 is blocked, the data of the blocked storage drive 350 can be recovered from the data of the remaining storage drives 350; however, if two storage drives 350 are blocked, the data of these two storage drives 350 cannot be recovered.

Also, in RAID6, even if two storage drives 350 are blocked, the data of the blocked storage drives 350 can be recovered from the data of the remaining storage drives 350; however, if three storage drives 350 are blocked, the data of these three storage drives 350 cannot be recovered.

In the configuration of RAID1+0, even if one storage drive 350 is blocked, the data of the blocked storage drive 350 can be recovered from the data of mirrored storage drive 350 which is paired with the storage drive 350. Even if two storage drives 350 are blocked, in the case where those storage drives 350 are not a mirrored pair, the data of the blocked storage drives 350 can be recovered from the data of respective paired storage drives 350. However, in the case where the blocked two storage drives 350 are a mirrored pair, the data of these two storage drives 350 cannot be recovered.

<Blockage Processing Unit>

Referring back to FIG. 8, the blockage processing unit 640 collects information on the failure of each storage drive 350 included in the storage apparatus 300, and determines whether each storage drive 350 should be blocked based on information on the failure, then blocks the storage drive 350 that is subject to be blocked.

Also, the blockage processing unit 640 determines whether the state of each RAID group 340 is either "normal", "fall-back", or "blocked", and records the state in the "state" entry of the RAID group information management table 400.

The failures to be monitored by the blockage processing unit 640 are, for example, "mechanical error", "read/write error", "drive I/F error", "hardware error", "reassign/rewrite error", "drive check code error", "LA (Logical Address)/LRC (Longitudinal Redundancy Check) error", and "data transfer timeout."

The "mechanical error" is a failure such as an operational fault or loss of a component of the storage drive 350. The "read/write error" is a failure that causes a problem in reading and writing of data from and to the storage drive 350. The "drive I/F error" is a failure of the drive I/F 336. The "hardware error" is a failure such as a defect of a hard disk, or a breaking or a short-circuiting of electrical wiring included in the storage drive 350.

The "reassign/rewrite error" is a failure that causes a problem in rewriting or reassigning of data to the storage drive 350. The "drive check code error" is a failure of a case in which a code identical to a drive check code added at the time of reading or writing of data from or to the storage drive 350 cannot be read.

The "LA/LRC error" is failure of a case in which a code identical to a logical address or an LRC code added to a data block unit at the time of writing of data to the storage drive 350 cannot be read. The "data transfer timeout" is a failure in which a time required for reading or writing of data from or to the storage drive 350 exceeds a specified time.

These failures occurred in the storage drives 350 are notified to the blockage processing unit 640. Upon acquisition of these notifications, the blockage processing unit 640 records data in the "drive error count" entry of the drive state management table 420 for each type of failure for each storage drive 350 as shown in FIG. 12.

<Drive State Management Table>

The drive state management table 420 has entries of "drive number (also denoted as a drive #)", "RAID group number (also denoted as a RG#)", "drive type", "drive error count", "drive operating time", and "state."

The identification number of a storage drive 350 is recorded in the "drive number" entry. The identification number of the RAID group to which a storage drive 350 belongs is recorded in the "RAID group number" entry. The type of a storage drive 350 is recorded in the "drive type" entry. The accumulated number of occurrences of a failure for each type of failure since a storage drive 350 has come into use is recorded in the "drive error count" entry. The drive error count is updated by the blockage processing unit 640. An operating time since a storage drive 350 has come into use is recorded in the "drive operating time" entry.

The state of a storage drive 350 is recorded in the "state" entry. The state of each storage drive 350 recorded in the "state" entry is either "normal" or "blocked." The blockage processing unit 640 determines whether the state of each storage drive 350 is either "normal" or "blocked", and records the state in the "state" entry.

The blockage processing unit 640 determines whether the state of a storage drive 350 is either "normal" or "blocked" based on the drive type and the drive error count recorded in the drive state management table 420 and the threshold recorded in the drive type threshold management table 410 described later.

Specifically, for example, in a case the accumulated number of occurrences of mechanical errors of the storage drive 350 with drive number 6 reaches 50, the blockage processing unit 640 compares the accumulated number of the occurrences with the threshold of mechanical error for SATA in the drive type threshold management table 410, i.e., 50, and detects that the accumulated number of occurrences has reached the threshold and blocks the drive number 6.

The blockage processing device 640 updates each content (drive error count, drive operating time, and state) in the drive state management table 420 periodically, for example, every minute.

<Drive Type Threshold Management Table>

A preset threshold as a fixed value for each type of storage drive 350 and for each type of failure is recorded in the drive type threshold management table 410 for the blockage processing unit 640 to determine the state of each storage drive 350. The drive type threshold management table 410 is shown in FIG. 13.

The blockage processing unit 640 compares the accumulated number of occurrences of a failure recorded for each type of failure in the "drive error count" entry of the drive state management table 420 with the threshold recorded for each type of failure in the "error threshold" entry of the drive type threshold management table 410, and blocks the storage drive 350 whose accumulated number of occurrence of a failure reaches or exceeds the threshold.

Then the blockage processing unit 640 rewrites "blocked" to the field of the "state" entry for the blocked storage drive 350 in the drive state management table 420. Also, the blockage processing unit 640 updates the "state" entry of a RAID group in the RAID group information management table 400 to "fall-back" or "blocked", the RAID group to which the blocked storage drive 350 belongs.

<Start Time Calculation Unit>

Referring back to FIG. 8, the start time calculation unit 650 calculates a start time of recovery processing to delete the fall-back state of the RAID group 340 including the storage drive 350 blocked by the blockage processing unit 640, according to a priority set for the relevant RAID group 340.

As described below, the start time calculation unit 650 of the present embodiment first determines the time period from the current time to the start time of recovery processing (hereinafter also denoted as recovery start time), and determines the start time of recovery processing based on the current time and the recovery start time. It is a matter of course that another embodiment may be implemented in which the start time of the recovery processing is directly determined instead of first determining the recovery processing start time.

FIG. 11 shows how the start time calculation unit 650 calculates a recovery start time according to priority in the present embodiment. The present embodiment shows that the first storage drive 350 in the RAID group 340 is blocked due to a failure at the time indicated by (A) in FIG. 11. The time period indicated by (D) shows the recovery start time calculated according to the priority set to the RAID group 340. Note that the recovery start time indicated by (D) in FIG. 11 is an example of the case where the priority is set to 0.

First, as shown in (1) of FIG. 11, the start time calculation unit 650 calculates the expected RG blockage time from (A) to (B). The expected RG block time is expected time period between a time a non-blocked storage drive 350 in the RAID group 340 is further blocked so that delete of the fall-back state of the RAID group 340 becomes impossible until the RAID group 340 is blocked. The expected RG block time may be an expected time period until a non-blocked storage drive 350 in the RAID group 340 is further blocked.

Next, the start time calculation unit 650 calculates the time period as shown in (2) of FIG. 11 by subtracting the recovery processing time, that is, expected time period required for the recovery processing (the time period from (C) to (B) shown in (2) of FIG. 11) from the expected RG block time (also denoted as the latest recovery processing start time, the time period from (A) to (C)). The latest recovery processing start time is a time before which recovery processing is to be started at the latest, so that the recovery processing can be completed before the RAID group 340 is expected to be blocked. Details on the recovery processing time is described later. Also, the latest recovery processing start time can be determined by the current time and the above-mentioned latest recovery processing start time.

The start time calculation unit 650 changes the length of the latest recovery processing start time in a degree according to the priority set to the RAID group 340 not exceeding the latest recovery processing start time as shown in (3) of FIG. 11. In the example shown in FIG. 11, when the priority is set to 100, the recovery start time is calculated to be 0, and the recovery processing execution unit 670 starts the recovery processing immediately. When the priority is set to 0, the recovery start time is calculated to be the latest recovery processing start time, and the recovery processing execution unit 670 starts recovery processing at the latest recovery processing start time. That is, the start time of recovery processing is determined within a range between the current time and the latest recovery processing start time according to the priority set to the target RAID group 340 for recovery processing.

<Recovery Processing Time Management Table>

The recovery processing times are pre-recorded in the recovery processing time management table 430 as shown in FIG. 14.

The recovery processing time required for each recovery processing for each RAID level according to the number of normal storage drives 350 in RAID group 340 is recorded in the recovery processing time management table 430. Also, each recovery processing time is recorded per type of each storage drive 350 included in the RAID group (for example, SAS, SATA), per capacity (such as 146 GB, 2 TB), and per content of the recovery processing (for example, correction copy, copy back).

The start time calculation unit 650, when calculating the recovery start time, refers to the recovery processing time management table 430 to acquire a recovery processing time based on the information of the RAID level of the RAID group for which recovery processing is performed, the number of normal storage drives 350 in the RAID group, the types and capacities of the storage drives 350 included in the RAID group, and the content of the recovery processing.

The start time calculation unit 650 calculates the recovery start time in the above manner.

<Recovery Processing Scheduling Table>

When the recovery start time is calculated in the above manner, the start time calculation unit 650 calculates the start time of recovery processing based on the calculated recovery start time and the current time. The start time calculation unit 650 then records specific information including the number of the target storage drive 350 for recovery processing, the number of the RAID group 340 to which the storage drive 350 belongs, and start time of the recovery processing, in the recovery processing scheduling table 440 in the scheduled execution order of the recovery processing as shown in FIG. 15.

As shown in FIG. 15, the recovery processing scheduling table 440 has stored therein the start time of each recovery processing on standby at the current moment.

Specifics of each recovery processing such as the number of the target RAID group 340 for recovery processing, the number of blocked storage drive 350, in the execution order of the recovery processing are recorded in the recovery processing scheduling table 440 shown in FIG. 15.

The execution order of the recovery processing recorded in the recovery processing scheduling table 440 is not necessarily the order of priorities set to the respective RAID groups 340. The execution order of the recovery processing is determined by factors such as the time when a failure has occurred, estimated time until blockage, and recovery processing time of the RAID group 340, in addition to the priorities set to the respective RAID groups 340.

The execution schedule of the recovery processing may be referred from the management PC 200. FIG. 16 shows how the execution schedule of the recovery processing is displayed on the output device 260 of the management PC 200. The storage display unit 610 of the management PC 200 acquires the contents of the recovery processing scheduling table 440 and the contents of the RAID group information management table 400 to display the execution schedule of each recovery processing on the output device 260.

<Recovery Processing Execution Unit>

The recovery processing execution unit 660 performs recovery processing such as a correction copy and a copy back. For example, the recovery processing execution unit 660 starts recovery processing at the scheduled start time of recovery processing recorded in the above-mentioned recovery processing scheduling table 440.

When recovery processing is performed, considerable amount of load is borne by the CPU 331. For this reason, a plurality of recovery processing may be preferably performed sequentially one at a time to avoid concurrent execution of the recovery processing according to the throughput of the CPU 331 or specification of the storage apparatus 300 in order to prevent the data input/output processing between the host PC 100 and the storage apparatus 300 from being influenced.

In this case, for example, if the preceding recovery processing is not completed even at the start time of recovery processing recorded in the recovery processing scheduling table 440, the recovery processing execution unit 660 starts the subsequent recovery processing after the preceding recovery processing is completed.

Thereby, the recovery processing may be performed without the data input/output processing between the host PC 100 and the storage apparatus 300 being influenced.

Also, the recovery processing execution unit 660 acquires the load of hardware such as CPU 331 that implements the function of the I/O processing unit 630 even before the start time of recovery processing recorded in the recovery processing scheduling table 440, and starts the recovery processing if the value indicating the load of the CPU 331 is smaller than a predetermined value.

Thereby, the recovery processing may be completed at an early stage without the data input/output processing between the host PC 100 and the storage apparatus 300 being influenced.

==Flow of Processing==

Next, a flow of processing performed by the storage apparatus 300 according to the present embodiment is described.

<Priority Setting Processing>

Figure 17:
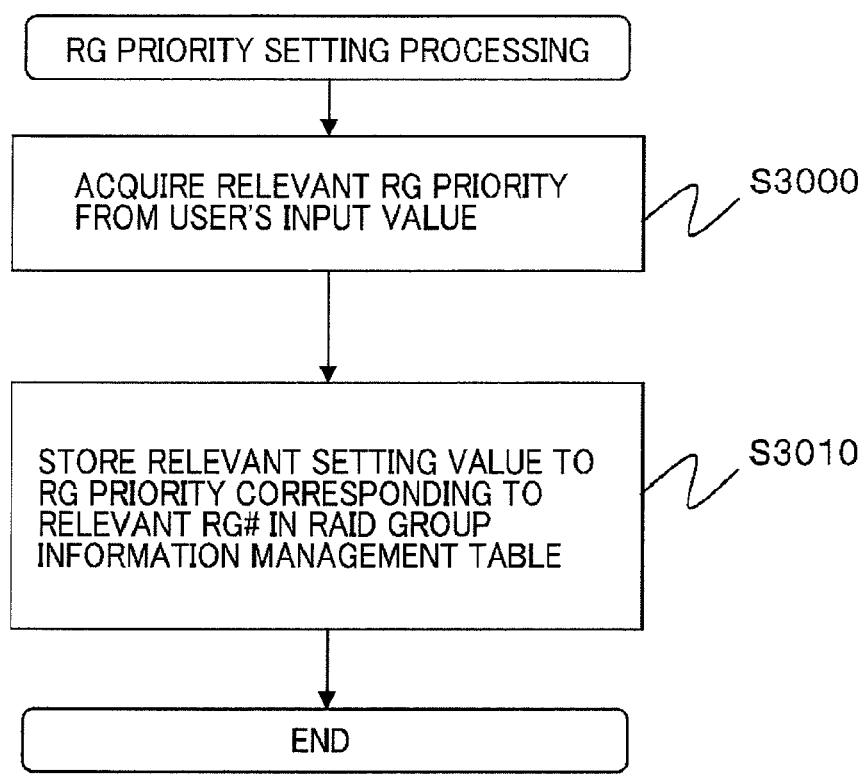
FIG. 17 is a flowchart showing a flow of priority setting processing for a RAID group of the present embodiment.

First, a processing flow to set a priority to each RAID group 340 by the storage apparatus 300 is described with reference to the flowchart of FIG. 17.

The storage apparatus 300 receives identification information for a RAID group 340 and priority set to the RAID group 340 from the management PC 200 (S3000). As mentioned above, these values are inputted, for example, from the screen of the management PC 200 shown in FIG. 10 by an operator or the like.

Next, the storage apparatus 300 records the identification information for the RAID group 340 and the priority set to the RAID group 340 in the RAID group information management table 400 (S3010).

<Entire Processing of Recovery Start Time Calculation>

Figure 18:
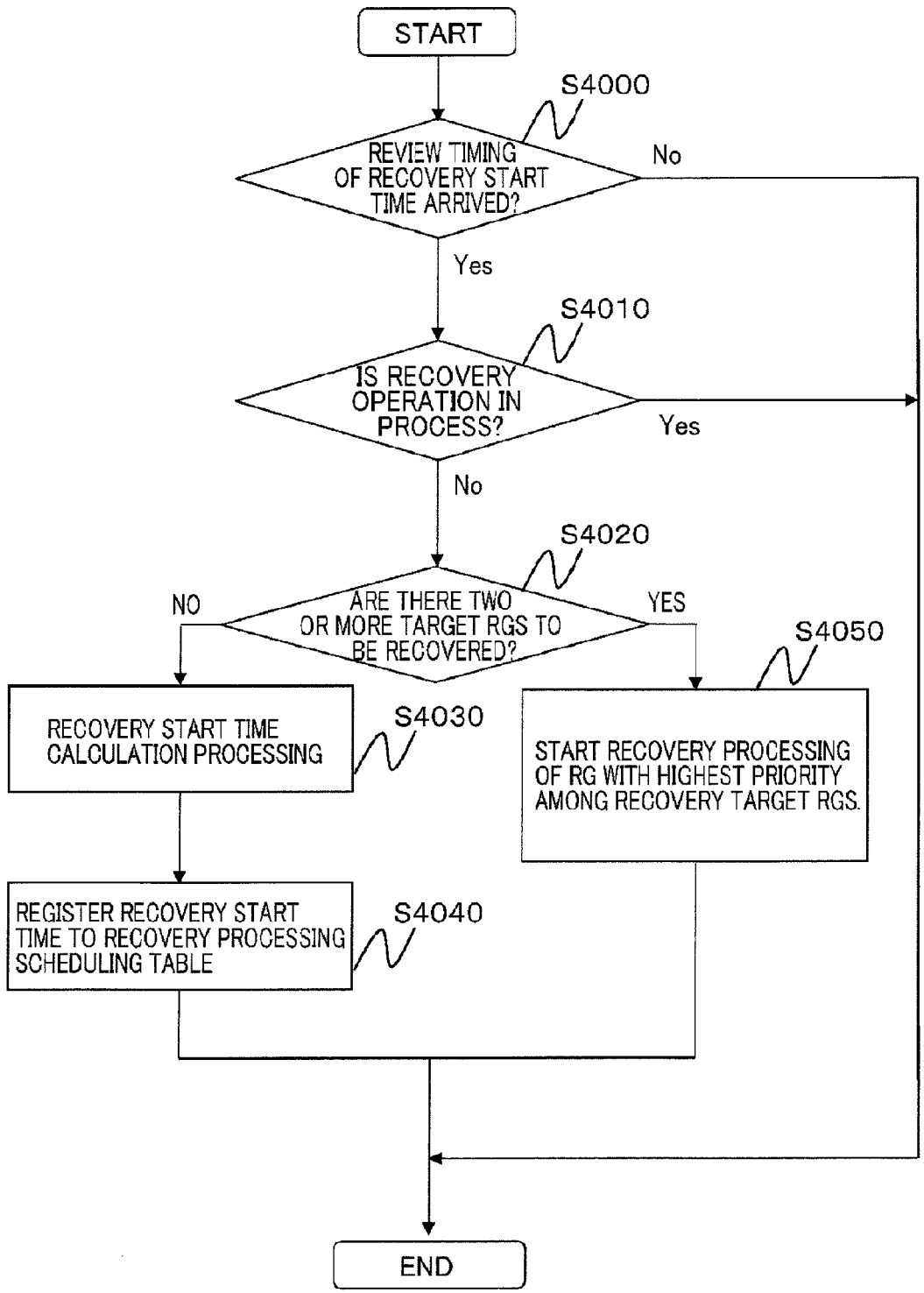
FIG. 18 is a flowchart showing an entire flow of recovery processing time calculation processing of the present embodiment.

Next, a flow of the entire processing of recovery start time calculation is described with reference to the flowchart of FIG. 18.

Figures 19, 20:
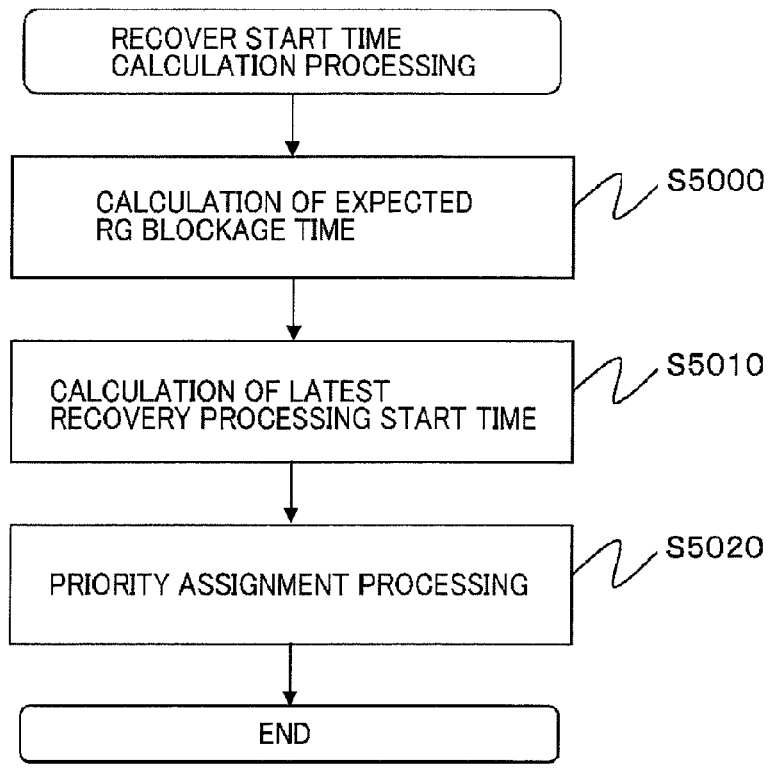
FIG. 19 is a diagram showing a timing to start recovery processing time calculation processing of the present embodiment.
FIG. 20 a flowchart showing a flow of the recovery processing time calculation processing of the present embodiment.

The storage apparatus 300 monitors whether or not a review timing of recovery start time has come (S4000). In the present embodiment, the review timing of recovery start time is either "when the storage drive 350 has a failure and is blocked", "when the preceding recovery processing for the storage drive 350 is completed", or "when the value of a priority set to the RAID group 340 is updated" as shown in FIG. 19. When any of the above timings has come in the storage apparatus 300, the process proceeds to "YES" in S4000.

Next, the storage apparatus 300 checks whether recovery processing is in operation at the time (S4010). If another preceding recovery processing is in operation, the storage apparatus 300 does not start to calculate the recovery start time until the recovery processing is completed ("YES" in S4010).

If no other recovery processing is in operation, the storage apparatus 300 checks whether two or more target RAID groups 340 to be recovered are present (S4020). Whether there are two or more target RAID groups 340 to be recovered can be determined based on whether the recovery processing on standby for its start time is recorded in the recovery process scheduling table 440 at the time.

If there are two or more target RAID groups 340 to be recovered, the process proceeds to "YES" in S4020. For example, if the recovery start time is already calculated, and at the moment, one or more recovery processing is on standby for its start time to come, the process proceeds to "YES" in S4020. In this case, the storage apparatus 300 refers to each priority set to each target RAID group 340 to which recovery processing is on standby, and immediately starts recovery processing of the RAID group with the highest priority regardless of the start time of the recovery processing recorded in the recovery processing scheduling table 440 (S4050). Details are described later.

On the other hand, if there is only one target RAID group to be recovered (if recovery processing on standby is not recorded in the recovery processing scheduling table 440), the process proceeds to "NO" in S4020.

The storage apparatus 300 then performs recovery start time calculation processing (S4030). The recovery start time calculation processing is described later. The storage apparatus 300 calculates an expected start time of recovery processing based on the current time and the recovery processing start time after calculating the recovery processing start time, and registers the estimated start time to the recovery processing scheduling table 440 (S4040).

<Recovery Start Time Period Calculation Processing>

Next, a flow of recovery start time calculation processing is described with reference to the flowcharts and illustrations shown in FIGS. 20 to 29.

The storage apparatus 300 first calculates an expected time period until the RAID group 340 is blocked (S5000). The estimated time period until the RAID group 340 is blocked is the time period from (A) to (B) in FIG. 11.

Next, the storage apparatus 300 performs calculation processing to determine the latest recovery processing start time (S5010). The latest recovery processing start time is a time period from (A) to (C) in FIG. 11.

The storage apparatus 300 then calculates the recovery start time according to the latest recovery processing start time and the priority (S5020). Specifically, in the present embodiment, the storage apparatus 300 calculates the recovery start time by multiplying the latest recovery processing start time by a value from 0 to 1 determined according to priority. The details are described later.

<Expected RAID Group Blockage Time Calculation Processing>

Figure 21:
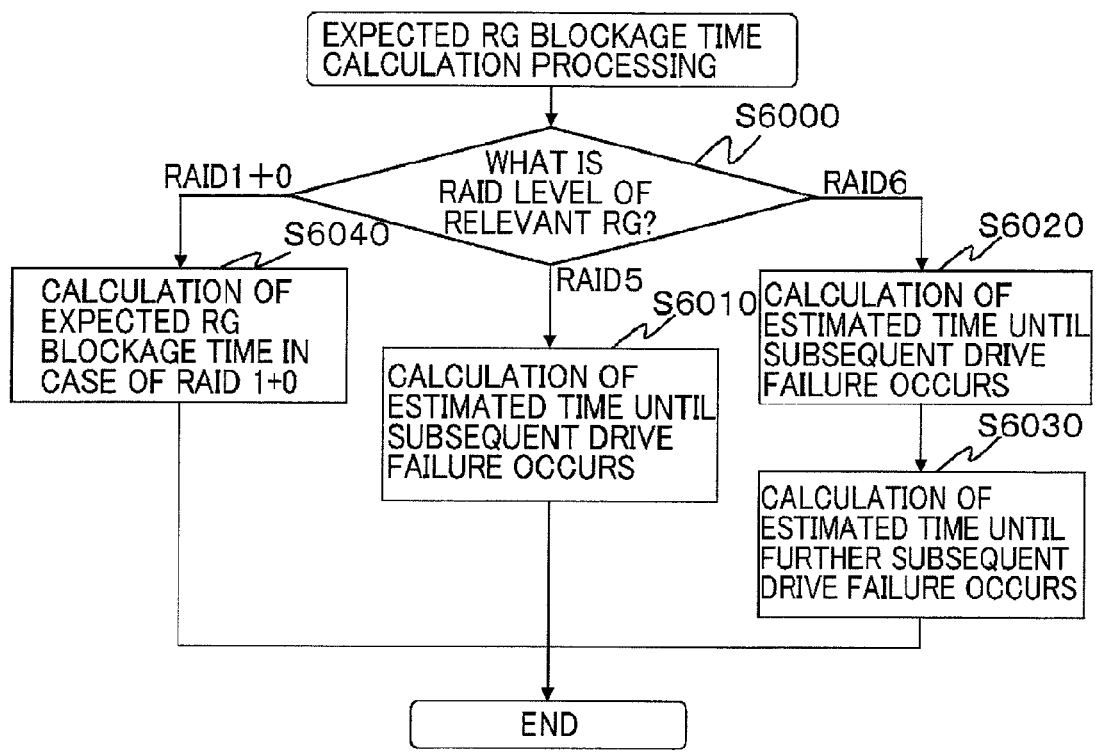
FIG. 21 is a flowchart showing a flow of expected RAID group block time calculation processing of the present embodiment.

Next, the above-mentioned expected RAID group blockage time calculation processing in S5000 is described with reference to the flowchart of FIG. 21.

The storage apparatus 300 first checks the RAID level of the target RAID group 340 for recovery processing start time calculation by referring to the RAID group information management table 400 (S6000).

—In the Case of RAID5—

In the case of RAID of level 5, if one other storage drive 350 is blocked, the RAID group 340 will be blocked. Thus, the storage apparatus 300 calculates an estimated time period until the subsequent failure of the storage drive occurs as the expected RAID group blockage time (S6010).

Figure 23:
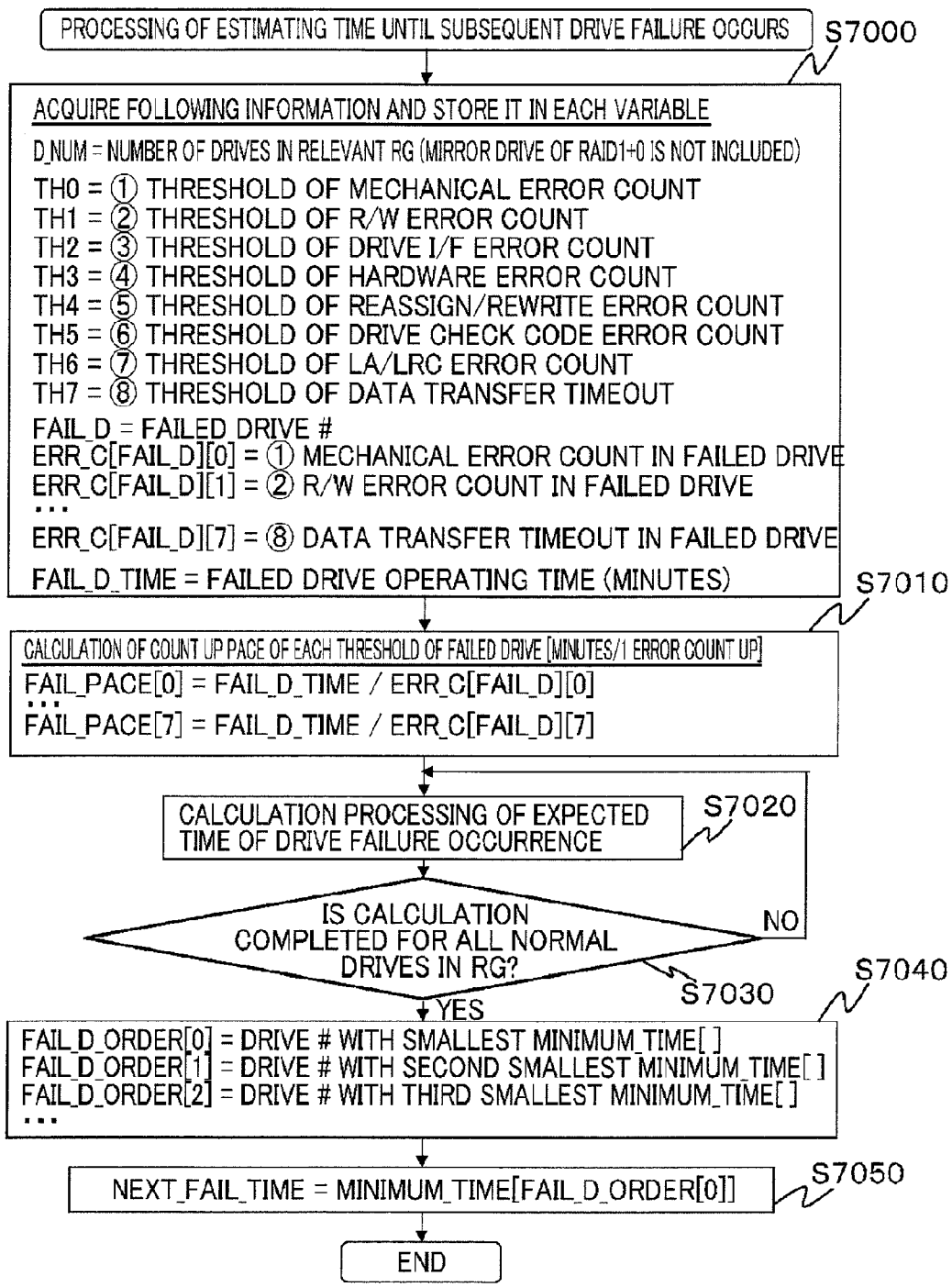
FIG. 23 is a flowchart showing a flow of subsequent drive failure occurrence time estimation processing of the present embodiment.
Figure 24:
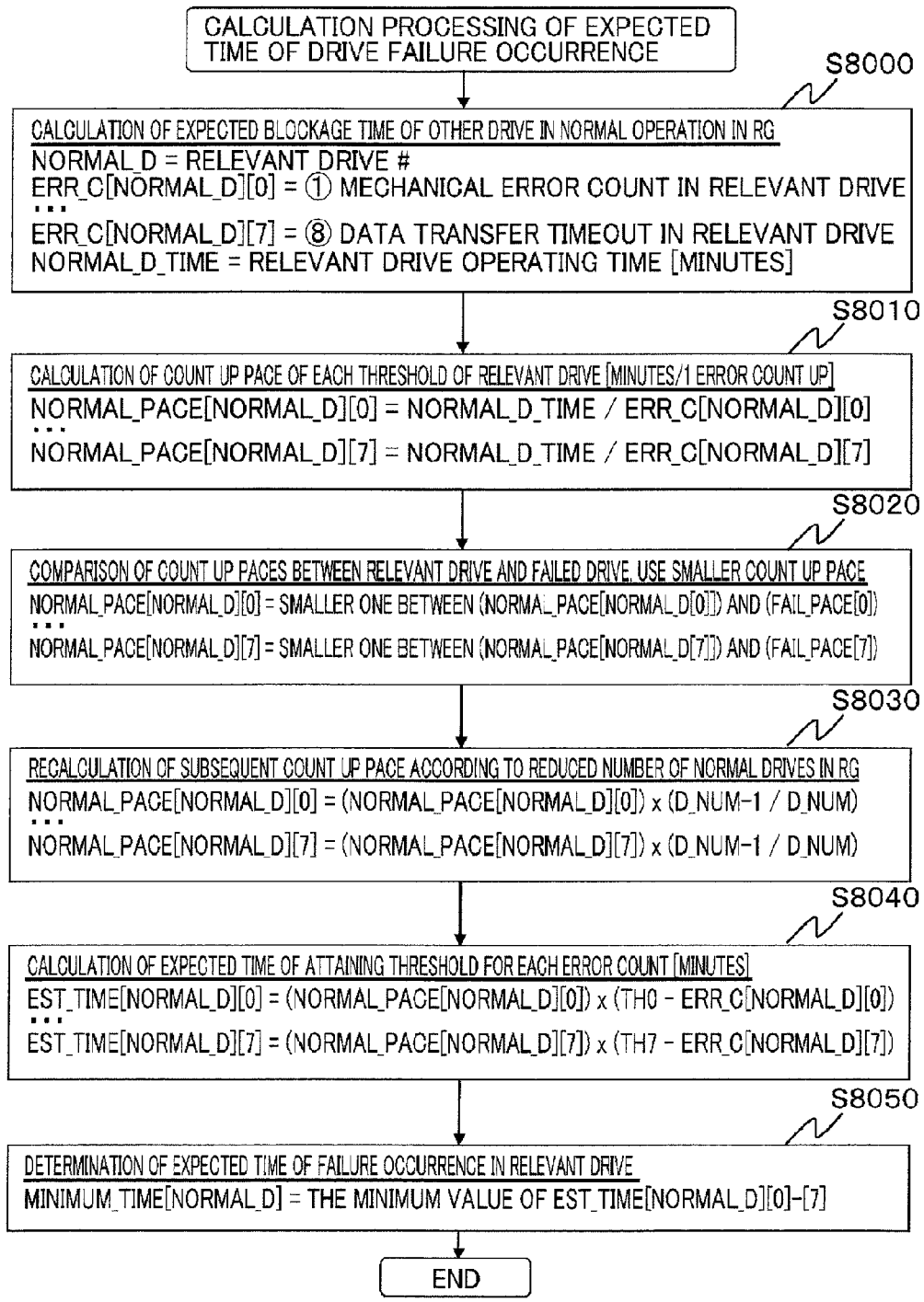
FIG. 24 is a flowchart showing a flow of expected drive failure occurrence time calculation processing of the present embodiment.

Referring to FIGS. 22 to 24, the expected RAID group blockage time calculation processing in the case of RAID5 is described.

FIG. 22 shows the case where the storage drive 350 (4) is blocked in the RAID group 340 of RAID5 which includes four storage drives 350 (1), (2), (3), and (4). FIG. 22 also shows that the reason why the storage drive 350 (4) is blocked is because the accumulated number of occurrences of error 2 of errors 1, 2, 3, and 4 has reached 50 times (threshold).

Since error 1 has occurred 20 times, error 2 50 times, error 3 15 times, and error 4 10 times in the storage drive 350 (4), the average time period required for each type of those errors to occur once (mean failure occurrence interval) can be calculated based on the operation time of the storage drive 350 (4). The example shown in FIG. 22 indicates that the mean failure occurrence interval for error 1, 2, 3, and 4 are AA, BB, CC, and DD minutes, respectively.

Also for the storage drive 350 (1), respective average time periods required for the error 1, 2, 3, and 4 to occur once can be calculated in a similar manner. FIG. 22 shows that in the case of storage drive 350 (1), the mean failure occurrence interval for error 1, 2, 3, and 4 are EE, FF, GG, and HH minutes, respectively.

In the present embodiment, the average time period required for each error to occur once calculated for storage drive 350 (1) is compared with that for storage drive 350 (4), and the smaller of the two is set as the average time period required for each error to occur once for the storage drive 350 (1).

Although the storage drive 350 (1) is not identical to the storage drive 350 (4), since these storage drives 350 constitute the same RAID group 340, it is considered that their installation locations in the storage apparatus 300 are also relatively close to each other in many cases, and their environmental conditions such as temperature, humidity, and vibration and the like, as well as their data access frequencies and access patterns from the host PC 100 are similar. Thus, it is assumed that the frequency and rate of failure occurrence in the storage drive 350 (1) are similar to those in the storage drive 350 (4).

Thus, even if the average time period required for each failure to occur once in the non-blocked storage drive 350 (1) is longer than that in the blocked storage drive 350 (4) as in the present embodiment, it is considered that the average time period required for each failure to occur once in the non-blocked storage drive 350 (1) can be determined with a higher accuracy by using the average time period required for each failure to occur once in the blocked storage drive 350 (4) as the average time period required for each failure to occur once in the non-blocked storage drive 350 (1).

Also, by using the shorter one of the average time periods required for an error to occur once, time period until the accumulated number of occurrences of the error exceeds a threshold can be calculated to be shorter, thus the recovery processing can be started at an earlier time. Accordingly, the possibility that the recovery processing is completed before the RAID group is blocked is increased, and the storage system 1000 can be operated more safely.

Also, in the present embodiment, the above calculated average time period required for each error to occur once is further multiplied by a coefficient of ¾.

This RAID group 340 originally handled read and write processing of data from and to the host PC 100 with four storage drives 350 (1), (2), (3), and (4), but now handles the processing with three storage drives 350 (1), (2), and (3) because the storage drive 350 (4) is blocked. Thus, the load of reading and writing of data from and to the storage drives 350 (1), (2), and (3) has increased to 4/3 times as that in the case of four storage drives 350. Accordingly, it is assumed that the average time period for an error to occur in each storage drive 350 is reduced to ¾.

Thus, by multiplying the average time period required for each error to occur once in the storage drive 350 (1) by ¾ as in the present embodiment, the average time period required for each error to occur once can be calculated appropriately according to the load of reading and writing of data from and to the storage drive 350 (1).

In the above manner, a time period until the accumulated number of occurrences of each error exceeds a threshold for the storage drive 350 (1) can be estimated based on the operating time of the storage drive 350, and respective average time periods required for error 1, 2, 3, and 4 to occur once. The example shown in FIG. 22 indicates that such time periods for error 1, 2, 3, and 4 are MMMM, NNNN, OOOO, and PPPP minutes, respectively.

The minimum value of these estimated time periods is determined to be an expected time period until the storage drive 350 (1) is blocked due to an occurrence of a failure.

Similarly, the storage apparatus 300 calculates respective expected time periods until the remaining storage drives 350 (2) and (3) are blocked.

The storage apparatus 300 determines the minimum value of the calculated expected time periods until blockage of the respective storage drives 350 (1), (2), and (3) to be the expected time until the blockage of RAID group 340.

The above-explained processing will be described with reference to the flowcharts shown in FIGS. 23 and 24.

The storage apparatus 300 first acquires the number of storage drives 350 belonging to RAID group 340, the threshold of accumulated number of occurrences of error for each storage drive 350, the number of the blocked storage drive 350, the accumulated number of occurrences of each error for blocked storage drive 350, and the operating time of blocked storage drive 350 (S7000).

The storage apparatus 300 then calculates an average time period required for each error to occur once in the blocked storage drive 350 (S7010).

The storage apparatus 300 then calculates an estimated time period until each non-blocked storage drive 350 belonging to the RAID group 340 is blocked (S7020). This processing is described with reference to FIG. 24.

The storage apparatus 300 first acquires the accumulated number of occurrences of a failure for each error and operating time of the non-blocked storage drive 350 (S8000).

The storage apparatus 300 then calculates an average time period required for each error to occur once (S8010).

The storage apparatus 300 determines the smaller one of the average time period required for each error to occur once in the blocked storage drive 350 calculated in S7010 and the value calculated in S8010 to be the average time period required for each error to occur once (S8020).

The storage apparatus 300 then multiplies each value calculated above by a coefficient corresponding to a load increase in read and write processing of data from and to the host PC 100 due to the blockage of one storage drive 350 (S8030).

The storage apparatus 300 calculates an expected time period required for the accumulated number of occurrences of each error to exceed a threshold by using the above calculated average time period required for each error to occur once, the accumulated number of occurrences of each error, and the threshold of each error (S8040).

The minimum value of the above calculated expected time periods required for the accumulated number of occurrences of respective errors to exceed a threshold is determined as the expected time period required for the storage drive 350 to be blocked (S8050).

Referring back to FIG. 23, the storage apparatus 300 performs each processing from S8000 to S8050 described above for each non-blocked storage drive 350 (S7030).

The storage apparatus 300 determines the numbers of non-blocked storage drives 350 in increasing order of estimated time period until blockage (S7040).

The storage apparatus 300 determines the minimum value of the expected time periods until blockage as the expected time period until the subsequent drive failure occurs and the RAID group 340 is blocked (S7050).

Note that, in the above-mentioned processing, after an average time period required for each error to occur once in a non-blocked storage drive 350 is calculated, the average time period was multiplied by a coefficient corresponding to a load increase in read and write processing of data due to the blockage of a single storage drive 350. However, there can be case where the average time period is not be multiplied by such coefficient. In this case, the storage apparatus 300 does not perform S8030. Thereby, the calculation of an average time period required for each error to occur once in a non-blocked storage drive 350 can be simplified.

Also, for the coefficient used as a multiplier for the calculation of an average time period required for each error to occur once in a non-blocked storage drive 350, for example, a coefficient according to the length of the operating time of the storage drive 350, or a coefficient according to the air temperature or humidity may be used. Thereby, the time when RAID group 340 is blocked can be estimated more accurately by considering an increase in failure occurrence frequency due to aged deterioration of the storage drive 350, the air temperature, humidity, and the like.

In the above manner, the expected RAID group blockage time (time period from (A) to (B) in FIG. 11) can be calculated in the case of RAID5.

In the above-mentioned processing, when the average time period required for each error to occur once in a non-blocked storage drive 350 is calculated, the above average time period is compared with that in blocked storage drive 350, and the smaller average time period is determined as the average time period required for each error to occur once in the non-blocked storage drive 350. However, the average time period required for each error to occur once in a non-blocked storage drive 350 may be used as it is. Thereby, the calculation of an average time period required for each error to occur once in the non-blocked storage drive 350 can be simplified, and the calculation of the recovery processing start time can be made in a shorter time.

Figure 25:
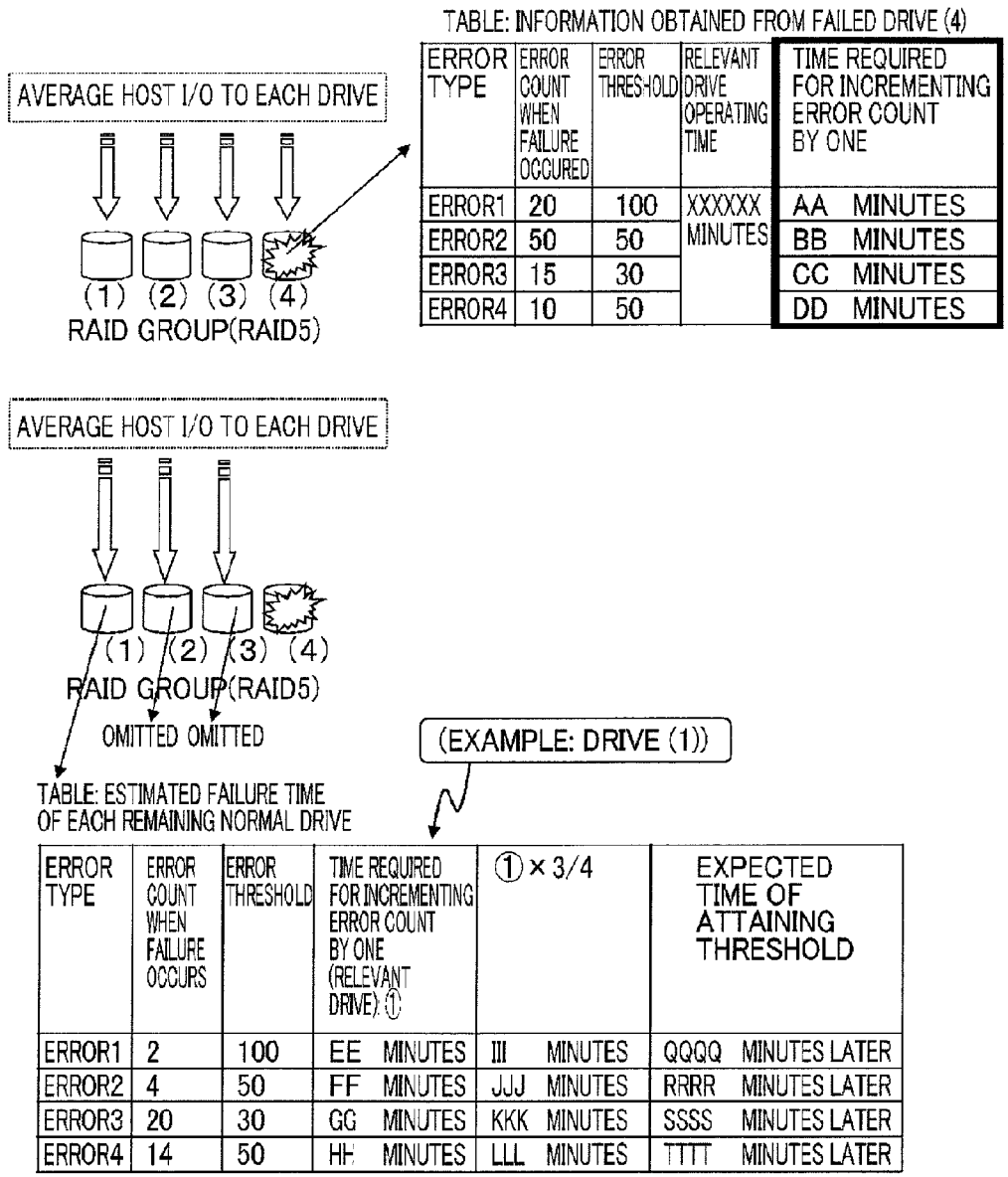
FIG. 25 is a diagram showing an example of an expected RAID group block time calculation method of the present embodiment.
Figure 26:
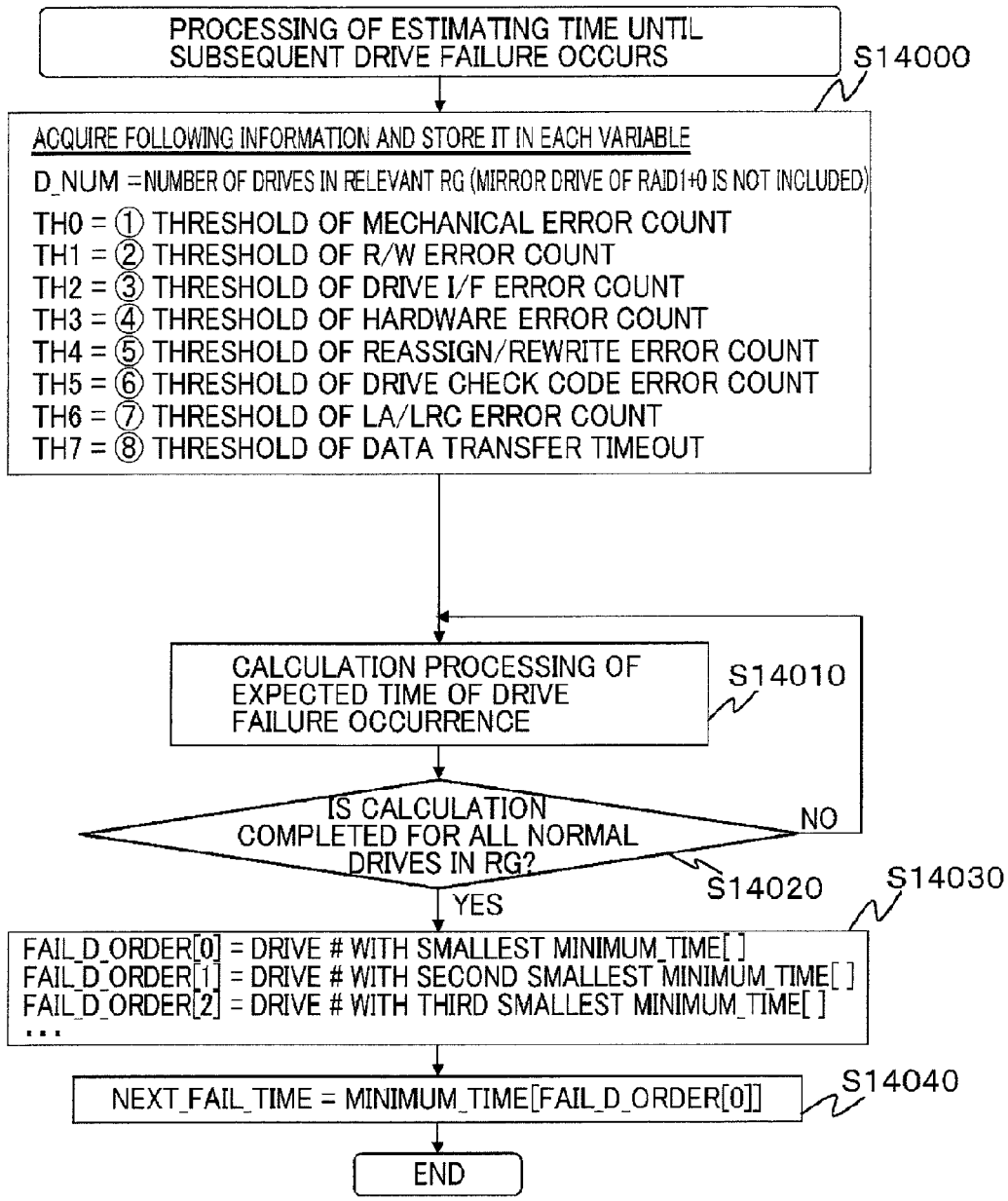
FIG. 26 is a flowchart showing a flow of subsequent drive failure occurrence time estimation processing of the present embodiment.
Figure 27:
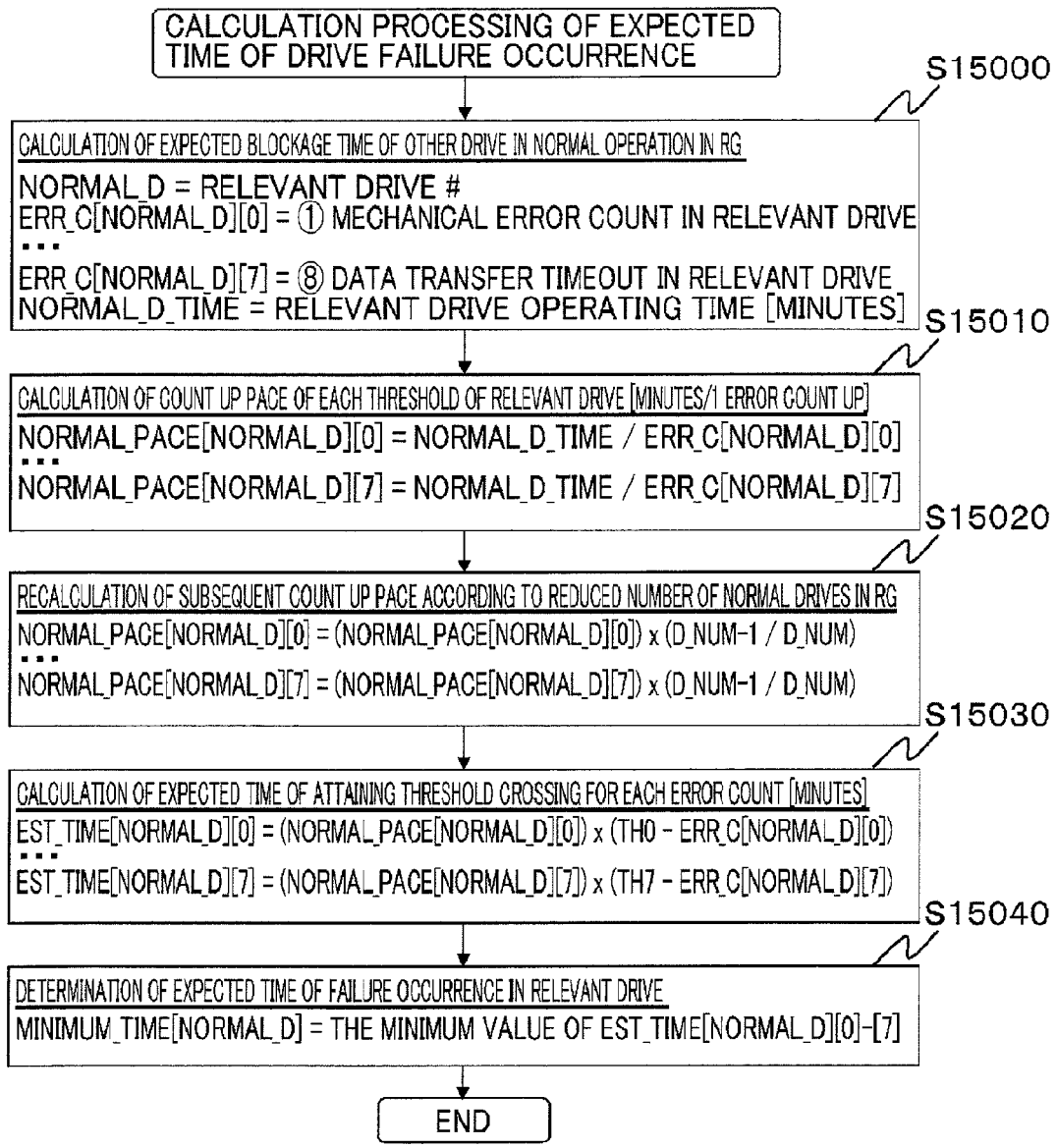
FIG. 27 is a flowchart showing a flow of expected drive failure occurrence time calculation processing of the present embodiment.

Referring to FIGS. 25 to 27, the expected RAID group blockage time calculation processing is described in the case where the average time period required for each error to occur once in a non-blocked storage drive 350 is used as it is.

FIG. 25 shows the case where the storage drive 350 (4) is blocked in the RAID group 340 of RAID5 which includes four storage drives 350 (1), (2), (3), and (4).

Since error 1 has occurred 2 times, error 2 4 times, error 3 20 times, and error 4 14 times in storage drive 350 (1) at the time storage drive 350 (4) is blocked, the average time period required for each type of those errors to occur once (mean failure occurrence interval) can be calculated based on the operating time of storage drive 350 (1). The example shown in FIG. 25 indicates that such average time period for error 1, 2, 3, and 4 to occur once are EE, FF, GG, and HH minutes, respectively.

Also, in the present embodiment, the above calculated average time period required for each error to occur once is further multiplied by a coefficient of ¾.

In the above manner, a time period until the accumulated number of occurrences of each error exceeds a threshold for storage drive 350 (1) can be estimated based on the operating time of storage drive 350, and respective average time periods required for error 1, 2, 3, and 4 to occur once. The example shown in FIG. 25 indicates that such time period for error 1, 2, 3, and 4 are QQQQ, RRRR, SSSS, and TTTT minutes, respectively.

The minimum value of these estimated time periods is determined to be the expected time period until storage drive 350 (1) is blocked after an occurrence of a failure.

Similarly, the storage apparatus 300 calculates respective expected time periods until the remaining storage drives 350 (2) and (3) are blocked.

The storage apparatus 300 determines the minimum value of the calculated expected time periods until blockage of the respective storage drives 350 (1), (2), and (3) to be the expected time until blockage of RAID group 340.

The above-explained processing is described with reference to the flowcharts shown in FIGS. 26 and 27.

The storage apparatus 300 first acquires the number of storage drives 350 belonging to RAID group 340, and the threshold of accumulated number of occurrences of error for each storage drive 350 (S14000).

The storage apparatus 300 then calculates an expected time period until each non-blocked storage drive 350 belonging to the RAID group 340 is blocked (S14010). This processing is described with reference to FIG. 27.

The storage apparatus 300 first acquires the accumulated number of occurrences of a failure, and the operating time for each error of non-blocked storage drives 350 (S15000).

The storage apparatus 300 then calculates an average time period required for each error to occur once (S15010).

The storage apparatus 300 then multiplies each value calculated above by a coefficient corresponding to a load increase in read and write processing of data from and to host PC 100 due to the blockage of one storage drive 350 (S15020).

The storage apparatus 300 calculates an expected time period required for the accumulated number of occurrences of each error to exceed a threshold by using the above calculated average time period required for each error to occur once, the accumulated number of occurrences of each error, and the threshold of each error (S15030).

The minimum value of the above calculated expected time periods required for the accumulated number of occurrences of respective errors to exceed a threshold is determined as the expected time period required for storage drive 350 to be blocked (S15040).

Referring back to FIG. 26, the storage apparatus 300 performs each processing from S15000 to S15040 described above for each non-blocked storage drive 350 (S14020).

The storage apparatus 300 determines the numbers of non-blocked storage drives 350 in an increasing order of expected time period until blockage (S14030).

Then the storage apparatus 300 determines the minimum value of the expected time periods until blockage as the expected time period until a subsequent drive failure occurs and RAID group 340 is blocked (S14040).

In the above manner, the expected RAID group blockage time (time period from (A) to (B) in FIG. 11) can be calculated in the case of RAID5.

Also, the expected RAID group blockage time may be calculated by assuming that the average time period required for each error to occur once in non-blocked storage drive 350 is equal to the average time period required for each error to occur once in blocked storage drive 350.

Although non-blocked storage drive 350 is not identical to blocked storage drive 350, since these storage drives 350 configure the same RAID group 340, it is considered that their installation locations in the storage apparatus 300 are also relatively close to each other in many cases, and their environmental conditions such as temperature, humidity, and vibration, as well as their data access frequencies and access patterns from the host PC 100 are similar. Thus, it is assumed that the frequency and rate of failure occurrence in the non-blocked storage drive 350 are similar to those in the blocked storage drive 350.

Thus, the expected RAID group blockage time can be calculated with a higher accuracy by assuming that the average time period required for each failure to occur once in the non-blocked storage drive 350 is equal to that in the blocked storage drive 350 as in the present embodiment.

Figure 29:
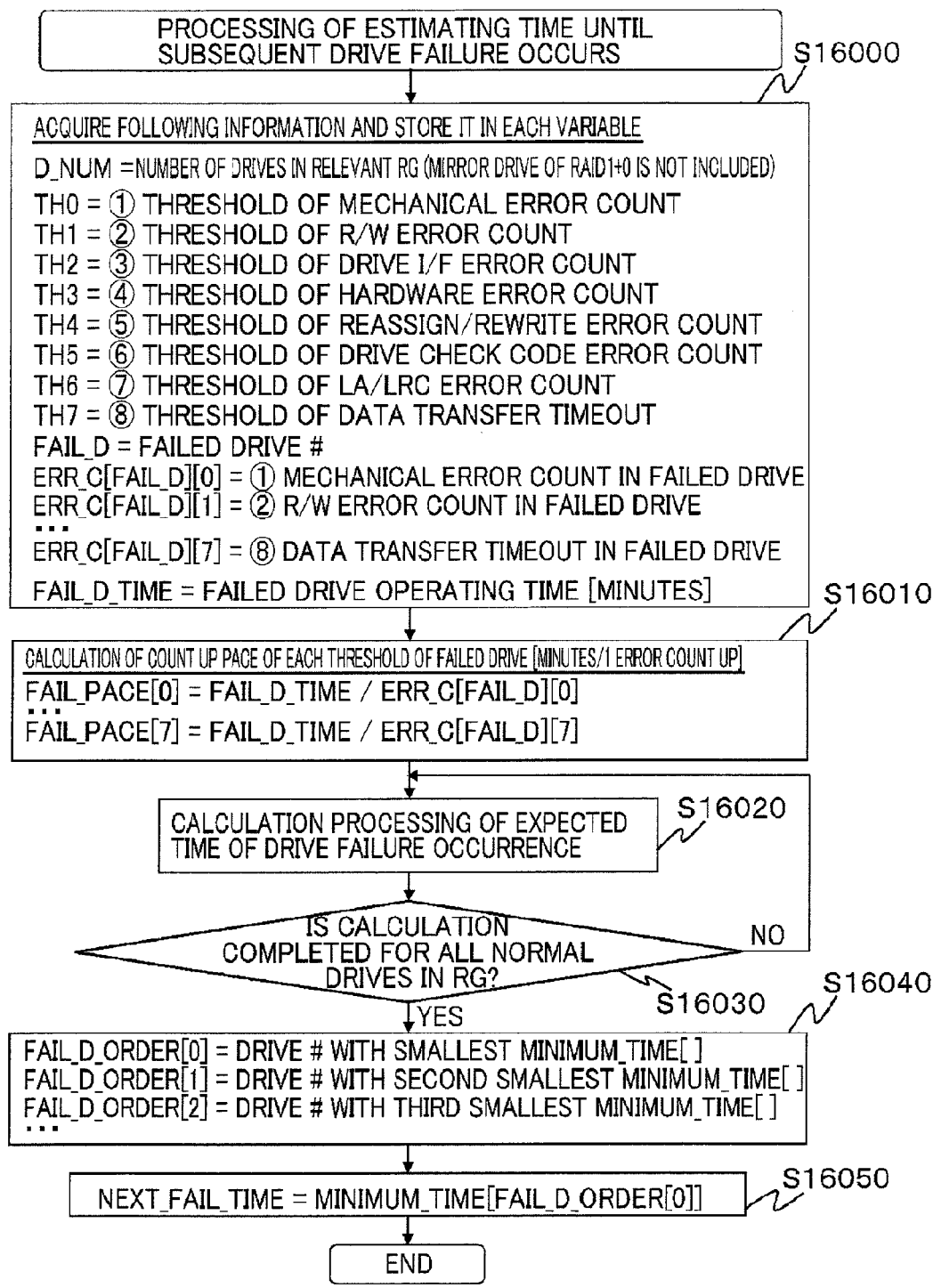
FIG. 29 is a flowchart showing a flow of subsequent drive failure occurrence time estimation processing of the present embodiment.
Figure 30:
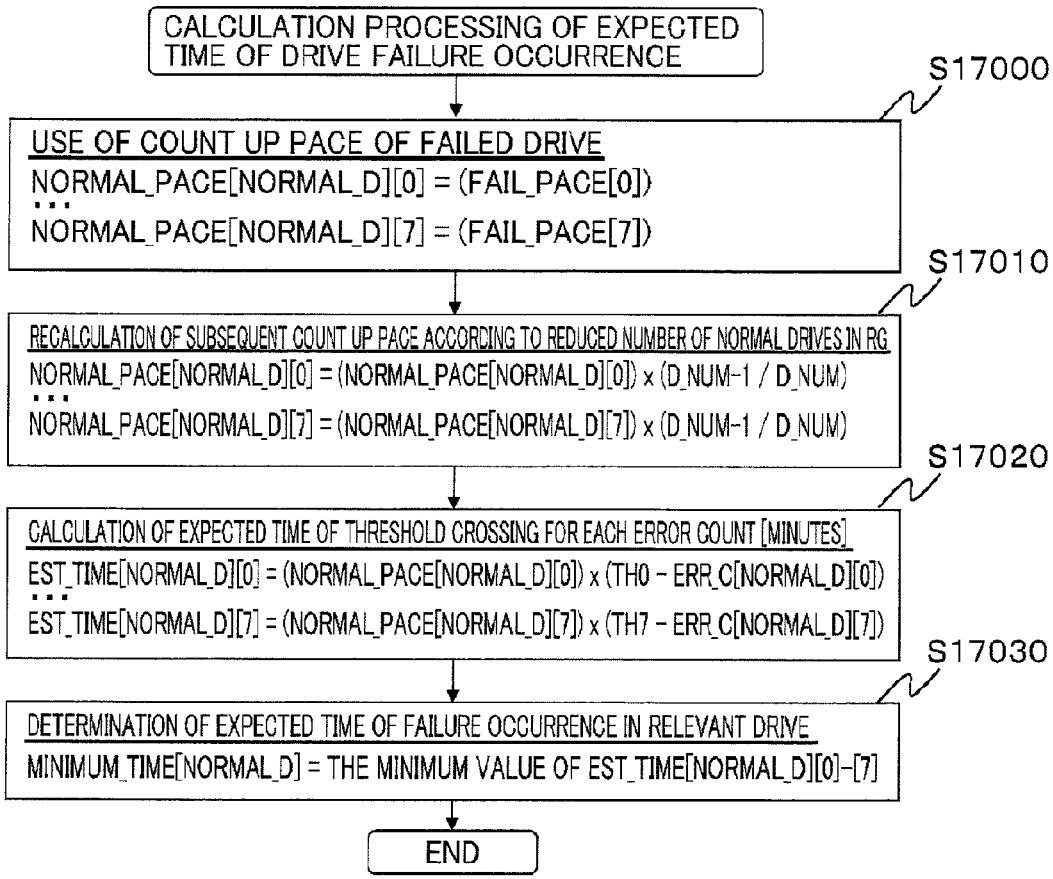
FIG. 30 is a flowchart showing a flow of expected drive failure occurrence time calculation processing of the present embodiment.

Referring to FIGS. 28 to 30, the case is described where the expected RAID group blockage time is calculated by assuming that the average time period required for each failure to occur once in non-blocked storage drive 350 is equal to that in blocked storage drive 350.

FIG. 28 shows the case where the storage drive 350 (4) is blocked in RAID group 340 of RAID5 which includes four storage drives 350 (1), (2), (3), and (4).

Since error 1 has occurred 20 times, error 2 50 times, error 3 15 times, and error 4 10 times in the storage drive 350 (4), the average time period required for each type of those errors to occur once (mean failure occurrence interval) can be calculated based on the operating time of the storage drive 350 (4). The example shown in FIG. 28 indicates that the mean failure occurrence interval for error 1, 2, 3, and 4 are AA, BB, CC, and DD minutes, respectively.

Also, in the present embodiment, it is assumed that the average time period required for each error to occur once in the storage drive 350 (1) is equal to that calculated for the storage drive 350 (4).

The above calculated average time period required for each error to occur once is then multiplied by a coefficient of ¾.

In the above manner, a time period until the accumulated number of occurrences of each error exceeds a threshold for storage drive 350 (1) can be estimated. The example shown in FIG. 28 indicates that such time period for error 1, 2, 3, and 4 are UUUU, VVVV, WWWW, and YYYY minutes, respectively.

The minimum value of these estimated time periods is determined to be the expected time period until storage drive 350 (1) is blocked due to an occurrence of a failure.

Similarly, the storage apparatus 300 calculates respective estimated time periods until the remaining storage drives 350 (2) and (3) are blocked.

The storage apparatus 300 determines the minimum value of the calculated estimated time periods until the respective storage drives 350 (1), (2), and (3) are blocked to be the estimated time until RAID group 340 is blocked.

The above-explained processing is described with reference to the flowcharts shown in FIGS. 29 and 30.

The storage apparatus 300 first acquires the number of the storage drives 350 belonging to the RAID group 340, the threshold of accumulated number of occurrences of error for each storage drive 350, the number of the blocked storage drive 350, the accumulated number of occurrences of each error for the blocked storage drive 350, and the operating time of the blocked storage drive 350 (S16000).

The storage apparatus 300 then calculates an average time period required for each error to occur once in the blocked storage drives 350 (S16010).

The storage apparatus 300 then calculates an estimated time period until each non-blocked storage drive 350 belonging to the RAID group 340 is blocked (S16020). This processing is described with reference to FIG. 30.

The storage apparatus 300 determines the average time period calculated in S16010 required for each error to occur once in the blocked storage drives 350 to be the average time period required for each error to occur once (S17000).

The storage apparatus 300 then multiplies each value calculated above by a coefficient corresponding to a load increase in read and write processing of data from and to the host PC 100 due to blockage of one storage drive 350 (S17010).

The storage apparatus 300 calculates an expected time period required for the accumulated number of occurrences of each error to exceed a threshold by using the above calculated average time period required for each error to occur once, the accumulated number of occurrences of each error, and the threshold of each error (S17020).

The minimum value of the above calculated expected time periods required for the accumulated number of occurrences of respective errors to exceed a threshold is determined as the expected time period required for the storage drive 350 to be blocked (S17030).

Referring back to FIG. 29, the storage apparatus 300 performs each processing from S17000 to S17030 above for each non-blocked storage drive 350 (S16030).

The storage apparatus 300 determines the numbers of non-blocked storage drives 350 in the increasing order of the expected time periods until blockage (S16040).

The storage apparatus 300 determines the minimum value of the expected time period until the blockage as the expected time period until a subsequent drive failure occurs and the RAID group 340 is blocked (S16050).

In the above manner, the expected RAID group blockage time (time period from (A) to (B) in FIG. 11) can be calculated in the case of RAID5.

—In the Case of RAID6—

Referring back to FIG. 21, in the case of RAID of level 6, if two more of storage drives 350 are blocked, the RAID group 340 would be blocked. Thus, the storage apparatus 300 calculates an estimated time period until a subsequent failure of the storage drive occurs (S6020), as well as an estimated time period until a further subsequent failure of the storage drive occurs (S6030). In this manner, the storage apparatus 300 calculates the expected RAID group blockage time.

The calculation processing of an estimated time period until the subsequent storage drive failure occurs is similar to that in the case of RAID5.

Subsequently the storage apparatus 300 calculates an estimated time period until a further subsequent storage drive failure occurs (S6030).

Figure 31:
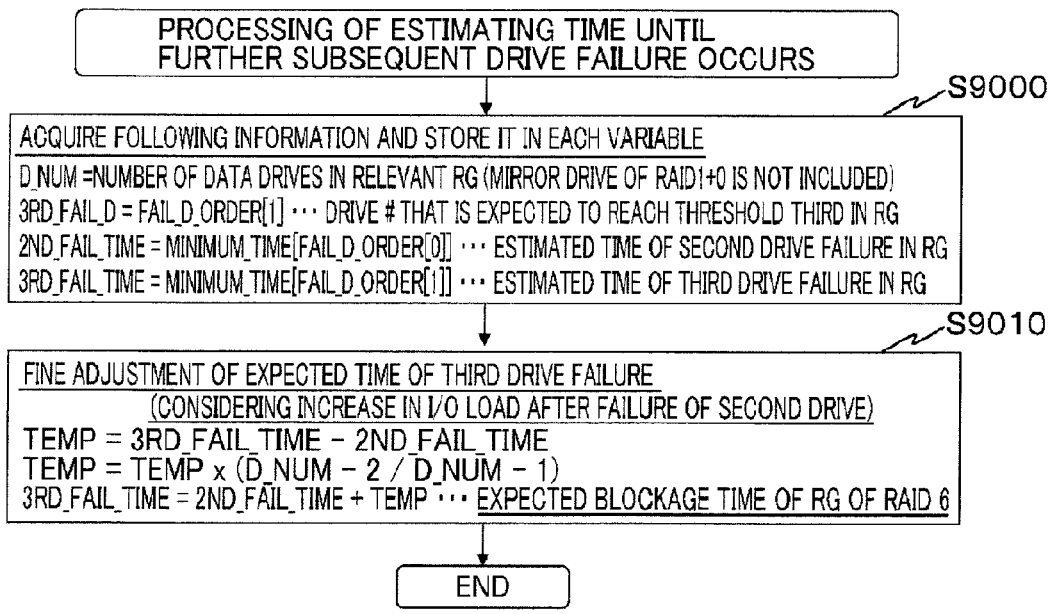
FIG. 31 is a flowchart showing a flow of further subsequent drive failure occurrence time estimation processing of the present embodiment.
Figure 32:
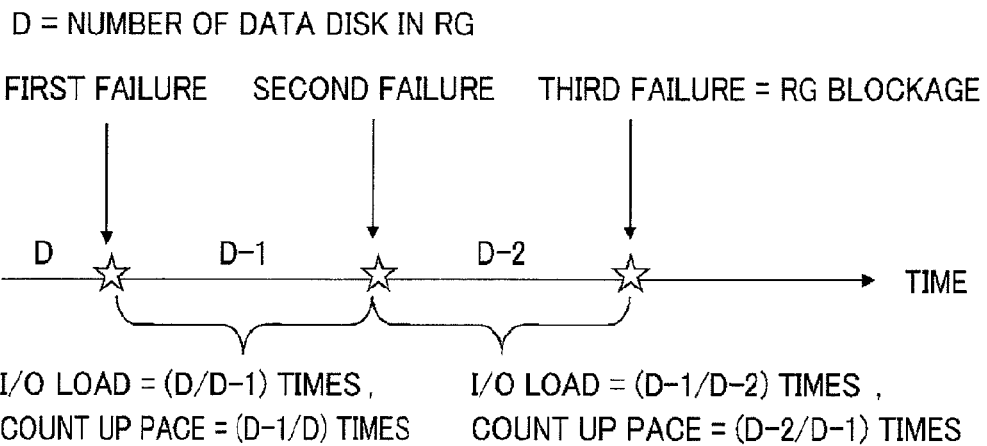
FIG. 32 is a diagram showing an example of an expected RAID group block time calculation method in the case of RAID6 of the present embodiment.
Figure 33:
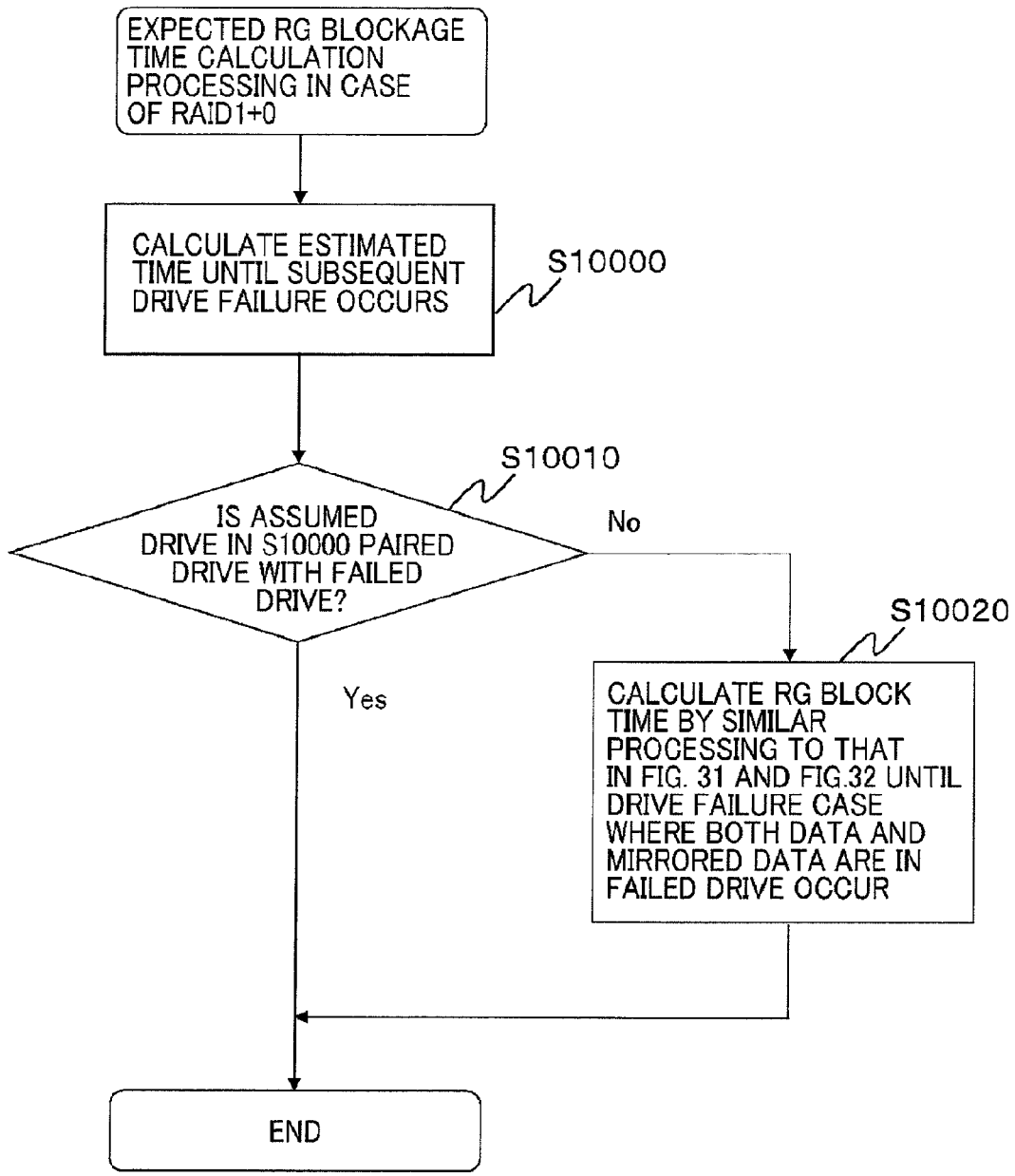
FIG. 33 is a flowchart showing a flow of an expected RAID group block time calculation processing in the case of RAID1+0 of the present embodiment.

Referring to FIGS. 31 and 32, the calculation processing of an estimated time period until a further subsequent storage drive failure occurs is described.

The storage apparatus 300 first acquires the number of storage drives 350 in RAID group 340, the number of the storage drive 350 which is expected to be the third to have the accumulated number of occurrences of a failure to reach a threshold acquired in S7040, the expected time period until a subsequent storage drive 350 is blocked, and the estimated time period until a further subsequent storage drive 350 is blocked (S9000).

The storage apparatus 300 calculates an expected time period until the third storage drive 350 is blocked by taking into account a coefficient corresponding to an increase in failure occurrence rate due to a load increase of reading and writing of data from and to non-blocked storage drives 350 while the second storage drive 350 is blocked as shown in FIG. 32 (S9010).

—In the case of RAID 1+0—

In the configuration of RAID 1+0, even if two storage drives 350 are blocked, in the case where those storage drives 350 are not a mirrored pair, the data of the blocked storage drives 350 can be recovered from the data of respective paired storage drives 350. However, in the case where the blocked two storage drives 350 are a mirrored pair, the data of these two storage drives 350 cannot be recovered.

RG block expected time calculation processing in the case of RAID 1+0 configuration is described with reference to FIG. 27. The storage apparatus 300 first calculates an expected time period until a subsequent drive failure occurs (S10000). The calculation processing of an estimated time period until the subsequent storage drive failure occurs is similar to that in the case of RAID5.

The storage apparatus 300 then checks whether the storage drive 350 which is expected to have a failure is a drive paired with a storage drive 350 which already has been blocked (S10010).

If those storage drives 350 are paired drives, the RAID group is blocked at that point, thus the expected time period calculated in S10010 is the expected RAID group blockage time.

On the other hand, if they are not paired drives, the RAID group 340 is not blocked, thus the storage apparatus 300 performs the processing of a flow similar to the one shown in FIG. 31, and calculates an expected time period until two storage drives 350 in a mirrored pair are blocked (S10020).

<The Latest Recovery Processing Start Time>

Figure 34:
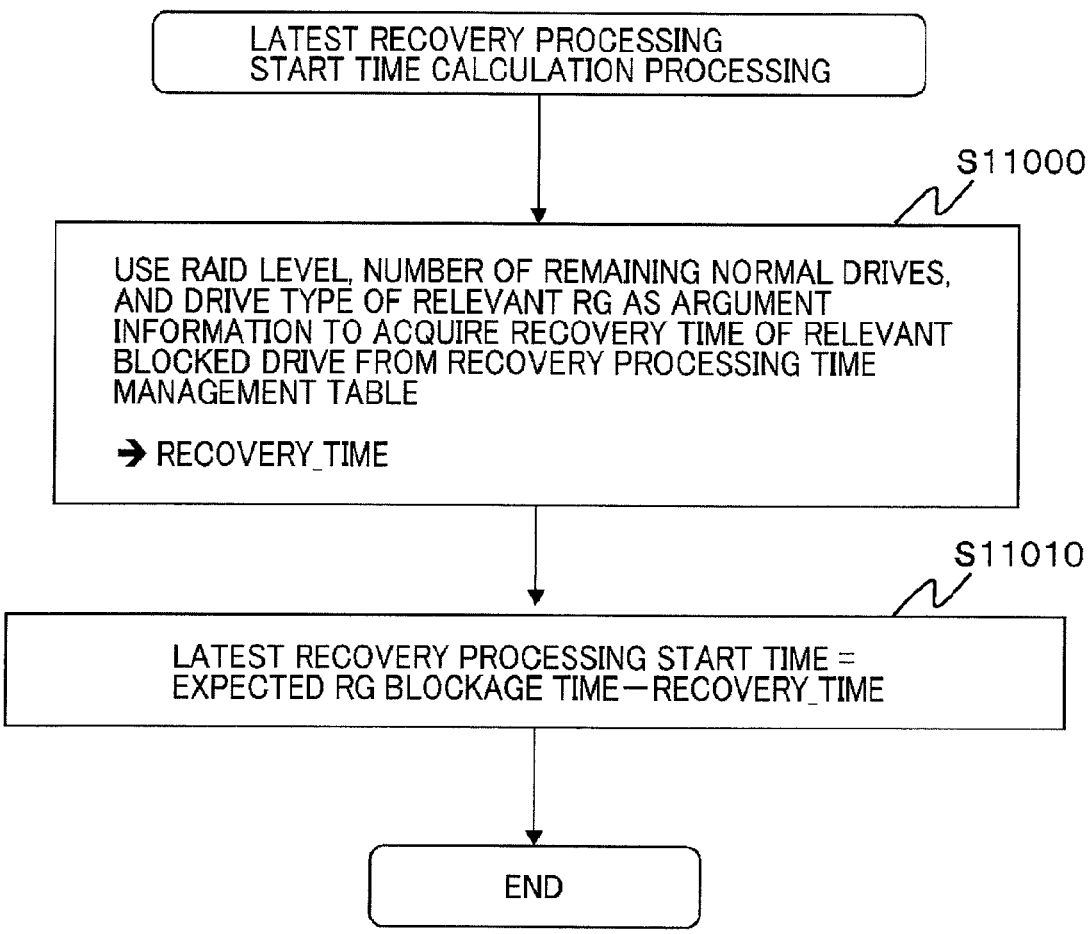
FIG. 34 is a flowchart showing a flow of latest recovery processing start time calculation processing of the present embodiment.

Referring back to FIG. 20, the storage apparatus 300 then performs the latest recovery processing start time calculation processing (S5010). The latest recovery processing start time is a time period from (A) to (C) in FIG. 11. The latest recovery processing start time calculation processing is described with reference to the flowchart shown in FIG. 34.

The storage apparatus 300 first refers to the recovery processing time management table 430 based on the RAID level, the number, the type, and the capacity of non-blocked storage drives 350, and the specifics of recovery processing (correction copy or copy back), then acquires the expected time period required for the recovery processing (S11000). The specifics of the recovery processing may be preset to the storage apparatus 300 from the management PC 200, or may be set from the management PC 200 when the calculation processing of the latest recovery processing start time is performed.

The storage apparatus 300 then subtracts the expected time period required for the recovery processing from the expected RAID group blockage time calculated in S5000 (S11010).

Thus, the storage apparatus 300 can calculate the latest recovery processing start time.

<Priority Assignment Processing>

Referring back to FIG. 20 again, the storage apparatus 300 then calculates a recovery start time according to the latest recovery processing start time and the priority (S5020). Specifically, in the present embodiment, the storage apparatus 300 calculates a recovery start time by multiplying the latest recovery processing start time by a value of 0 to 1 determined according to priority.

Figure 35:
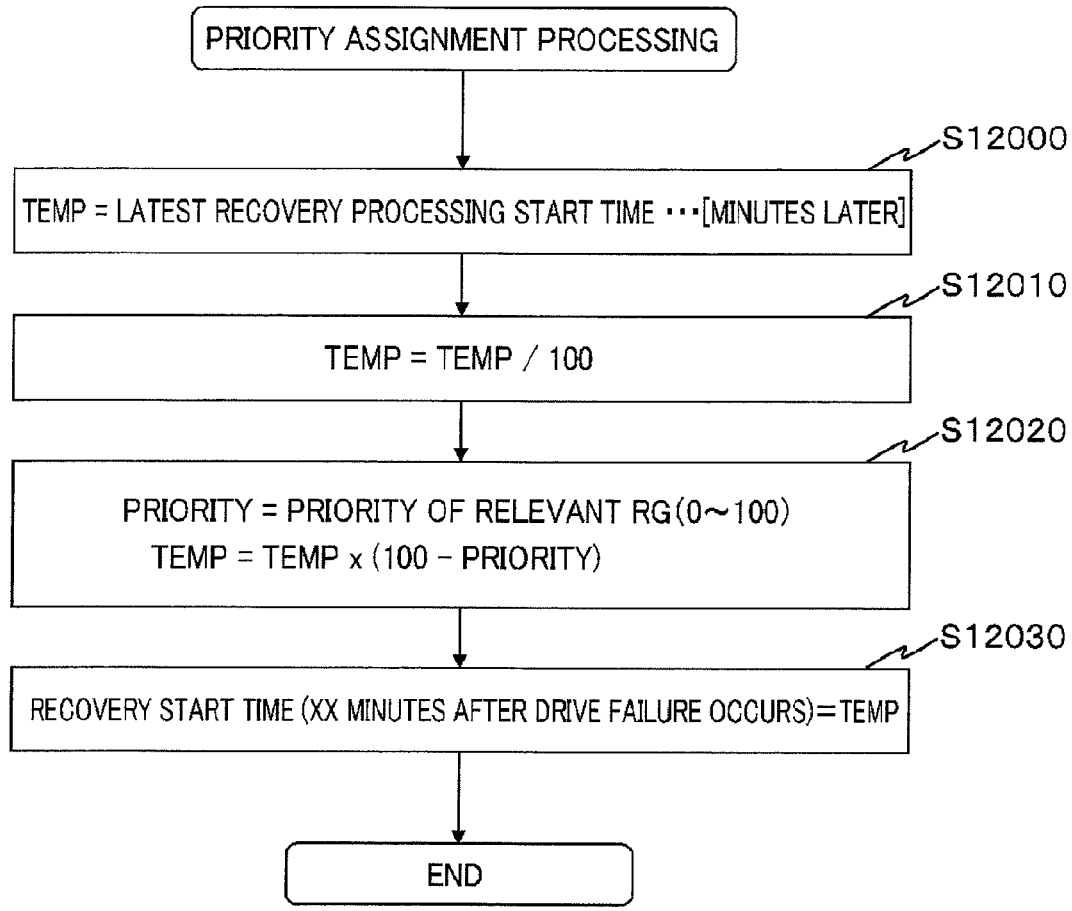
FIG. 35 is a flowchart showing a flow of priority assignment processing of the present embodiment.

As shown in the flowchart of FIG. 35, the storage apparatus 300 first acquires the latest recovery processing start time calculated in S5010 (S12000). The storage apparatus 300 then divides the latest recovery processing start time by 100 (S12010). Then, the storage apparatus 300 multiplies the value obtained by subtracting the priority value of the RAID group 340 from 100, by the above-mentioned latest recovery processing start time divided by 100 (S12020). The storage apparatus 300 calculates the value determined above as the recovery start time (S12030).

By calculating the recovery start time in the above manner, the recovery start time can be controlled according to the priority of the RAID group as shown in (D) of FIG. 11.

Of course, the calculation method of the recovery start time described above is one example. For example, the value of a priority is not limited to be in the range of 0 to 100, but may be in the range of 0 to 1.

<Specific Recovery Processing Time Calculation Processing>

Now, the calculation processing of recovery start time in the present embodiment is described based on specific numerical values. An exemplary case is described where the RAID group information management table 400, the drive state management table 420, the drive type threshold management table 410, and the recovery processing time management table 430 have the values shown in FIG. 36.

The storage apparatus 300 first refers to the drive state management table 420, and detects that the accumulated number of occurrences of a mechanical error in drive #1 is 50 times, reaching a threshold of 50 for mechanical error recorded in the drive type threshold management table 410.

Accordingly, the storage apparatus 300 determines that the drive #1 should be blocked and is so processed. Accordingly, the storage apparatus 300 sets the "state" of drive #1 in the drive state management table 420 to "blocked", and updates the "state" entry of RAID group 0 in the RAID group information management table 400 to "fall-back."

The storage apparatus 300 then calculates a recovery processing start time. Specifically, the storage apparatus 300 first calculates an expected RAID group blockage time.

The storage apparatus 300 refers to the drive state management table 420 to detect that the RAID group 0 to which drive #1 belongs is configured with drives #0, #1, and #2. The storage apparatus 300 also detects that the operating time of each drive is 2000 minutes.

—Drive #1—

The storage apparatus 300 calculates that the average time period required for a mechanical error to occur once in drive #1 is 40 (2000/50) minutes. The storage apparatus 300 calculates that the average time period required for a read/write error to occur once in drive #1 is 1000 (2000/2) minutes. The storage apparatus 300 calculates that the average time period required for a drive I/F error to occur once in drive #1 is 200 (2000/10) minutes. And the storage apparatus 300 calculates that the average time period required for a hardware error to occur once in drive #1 is 200 (2000/10) minutes.

—Drive #0—

Furthermore, the storage apparatus 300 calculates that the average time period required for a mechanical error to occur once in drive #0 is 40 (2000/50) minutes (because the average time period required for a mechanical error to occur once in drive #1 is shorter than that in drive #0). The storage apparatus 300 calculates that the average time period required for a read/write error to occur once in drive #0 is 1000 (2000/2) minutes. The storage apparatus 300 calculates that the average time period required for a drive I/F error to occur once in drive #0 is 200 (2000/10) minutes. And the storage apparatus 300 calculates that the average time period required for a hardware error to occur once in drive #0 is 200 (2000/10) minutes.

The storage apparatus 300 multiplies each of the above-mentioned average time periods by a coefficient of ⅔, and calculates that the average time period required for a mechanical error to occur once the drive #0 is 27 minutes. The storage apparatus 300 calculates that the average time period required for a read/write error to occur once in drive #0 is 667 minutes. The storage apparatus 300 calculates that the average time period required for a drive I/F error to occur once in drive #0 is 133 minutes. And the storage apparatus 300 calculates that the average time period required for a hardware error to occur once in drive #0 is 133 minutes.

The storage apparatus 300 calculates that the average time period required for the accumulated number of occurrences of a mechanical error to reach the threshold (50) in drive #0 is 270 minutes ((50−40)×27 minutes). The storage apparatus 300 calculates that the average time period required for the accumulated number of occurrences of a read/write error to reach the threshold (10) in drive #0 is 5336 minutes ((10−2)×667 minutes). The storage apparatus 300 calculates that the average time period required for the accumulated number of occurrences of a drive IT error to reach the threshold in drive #0 is 5320 minutes ((50−10)×133 minutes). And the storage apparatus 300 calculates that the average time period required for the accumulated number of occurrences of a hardware error to reach the threshold in drive #0 is 5320 minutes ((50−10)×133 minutes).

The storage apparatus 300 then calculates that the expected time period until drive #0 is blocked is 270 minutes, which is the minimum value of the above-mentioned values.

—Drive #2—

Next, the storage apparatus 300 calculates that the average time period required for a mechanical error to occur once in drive #2 is 40 (2000/50) minutes (because the average time period required for a mechanical error to occur once in drive #1 is shorter than that in drive #2). The storage apparatus 300 calculates that the average time period required for a read/write error to occur once in drive #2 is 1000 (2000/2) minutes. The storage apparatus 300 calculates that the average time period required for a drive I/F error to occur once in drive #2 is 200 (2000/10) minutes. And the storage apparatus 300 calculates that the average time period required for a hardware error to occur once in drive #2 is 200 (2000/10) minutes.

Then, the storage apparatus 300 multiplies each of the above-mentioned average time periods by a coefficient of ⅔, and calculates that the average time period required for a mechanical error to occur once in drive #2 is 27 minutes. The storage apparatus 300 calculates that the average time period required for a read/write error to occur once in drive #2 is 667 minutes. The storage apparatus 300 calculates that the average time period required for a drive I/F error to occur once in drive #2 is 133 minutes. And the storage apparatus 300 calculates that the average time period required for a hardware error to occur once in drive #2 is 133 minutes.

Then, the storage apparatus 300 calculates that the average time period required for the accumulated number of occurrences of a mechanical error to reach the threshold (50) in drive #2 is 270 minutes ((50−40)×27 minutes). The storage apparatus 300 calculates that the average time period required for the accumulated number of occurrences of a read/write error to reach the threshold (10) in drive #2 is 5336 minutes ((10−2)×667 minutes). The storage apparatus 300 calculates that the average time period required for the accumulated number of occurrences of a drive I/F error to reach the threshold in drive #2 is 5320 minutes ((50−10)×133 minutes). And the storage apparatus 300 calculates that the average time period required for the accumulated number of occurrences of a hardware error to reach the threshold in drive #2 is 5320 minutes ((50−10)×133 minutes).

The storage apparatus 300 then calculates that the expected time period until drive #2 is blocked is 270 minutes, which is the minimum value of the above-mentioned values.

From the above, the storage apparatus 300 calculates that the expected time period until the RAID group 0 is blocked is 270 minutes.

Next, the storage apparatus 300 refers to the recovery processing time management table 430 to acquire the time period required for a correction copy being 20 minutes.

The storage apparatus 300 then subtracts the time period required for the recovery processing, i.e., 20 minutes from the expected time period until RAID group 0 is blocked, i.e., 270 minutes, and determines that the latest recovery processing start time is 250 minutes.

The storage apparatus 300 then refers to the RAID group information management table 400 to detect that the priority set to the RAID group 0 is 20, thus calculates that the recovery processing start time is 200 ((100−20)×250/100) minutes.

Subsequently, the storage apparatus 300 calculates the time 200 minutes after the current time, and records the calculated time in the recovery processing scheduling table 440 along with the number of drive #1 and the number of RAID group 0.

At the above-mentioned time, the storage apparatus 300 starts the relevant recovery processing.

<Processing in the Case of Two or More Target RAID Groups are to be Recovered>

Referring back to FIG. 18, in S4020, the storage apparatus 300 checks whether or not there are two or more target RAID groups 340 to be recovered (S4020). If there are two or more target RAID groups 340 to be recovered, the process proceeds to "YES" in S4020. For example, if a recovery start time has been calculated in the past, and there is one or more recovery processing on standby at the time, the process proceeds to "YES" in S4020.

In that case, the storage apparatus 300 refers to each priority set to each target RAID group 340 to which recovery processing is on standby, and starts to perform all the recovery processing recorded in the recovery processing scheduling table 440, sequentially one at a time starting with the recovery processing of the RAID group with the highest priority regardless of the respective estimated recovery start times (S4050).

Figure 37:
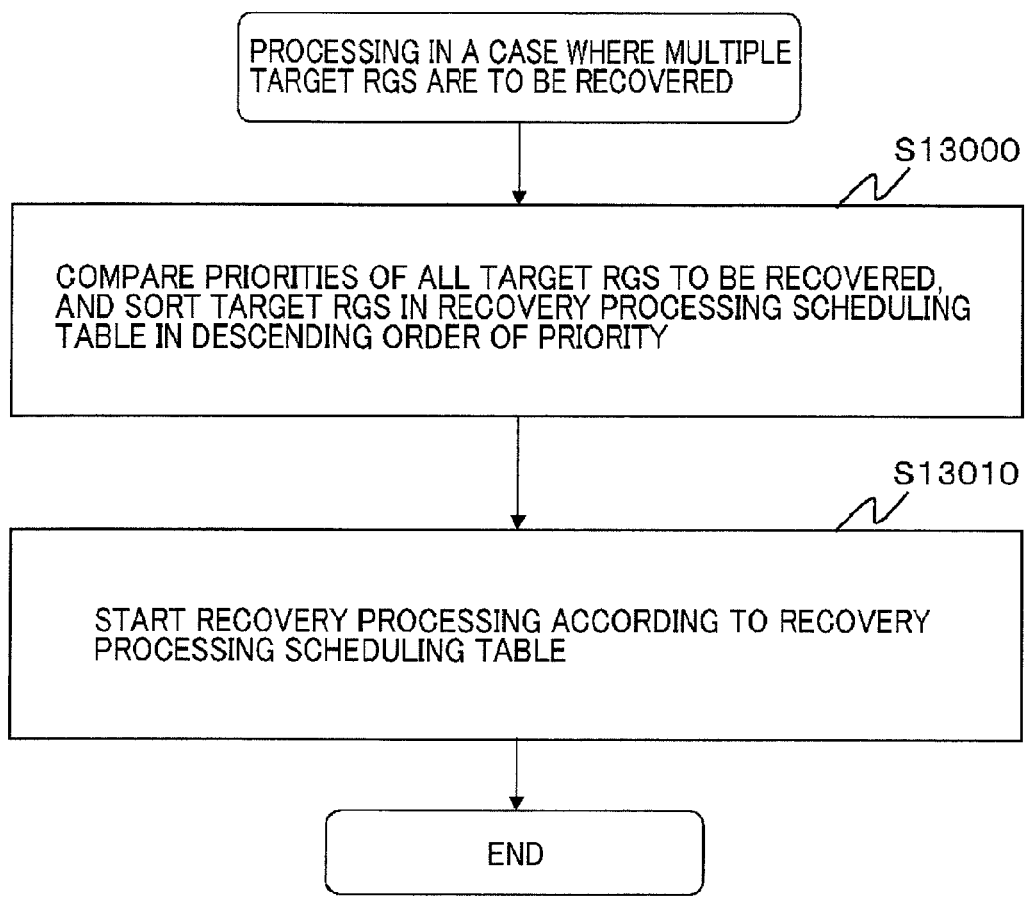
FIG. 37 is a flowchart showing a flow of processing in the case where a plurality of recovery target RAID groups is to be recovered of the present embodiment.
Figure 38:
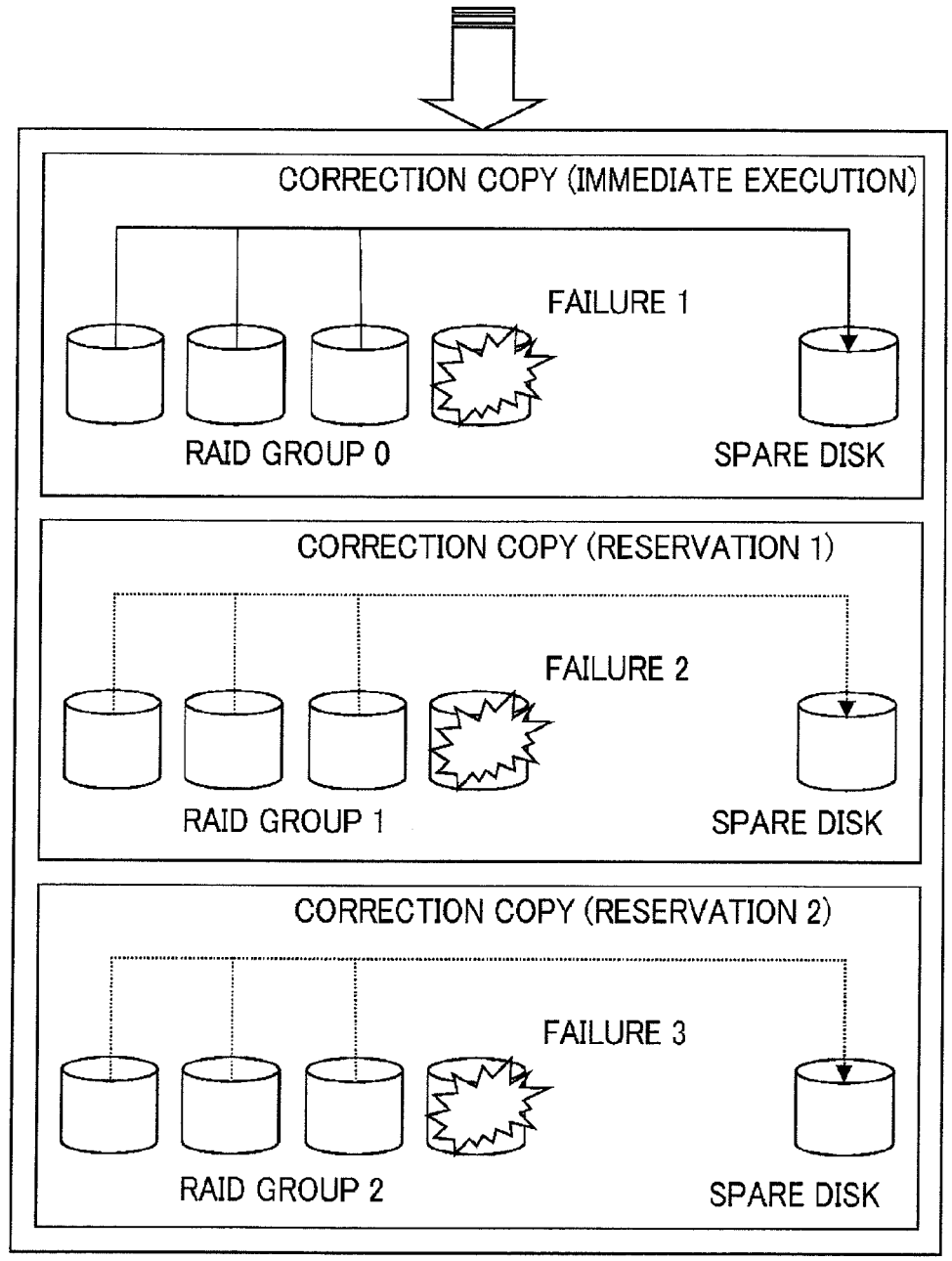
FIG. 38 is a diagram showing how recovery processing is performed on a plurality of RAID groups.

Specifically, as shown in the flowchart of FIG. 37, the storage apparatus 300 first compares the priorities of all the target RAID groups 340 to be recovered, and sorts the target RAID groups of the recovery processing scheduling table 440 in descending order of priority (S13000).

The storage apparatus 300 performs the recovery processing with the highest priority among the recovery processing recorded in the recovery processing scheduling table 440 (S13010).

For example, in the case where the recovery processing recorded in the recovery processing scheduling table 440 is in a state as shown in FIG. 16, the recovery processing is performed in the order of RAID group 000, RAID group 001, RAID group 002, and RAID group 003 sequentially regardless of respective expected recovery start times because the priorities of RAID group 000, RAID group 001, RAID group 002, and RAID group 003 are 100, 90, 75, and 50, respectively.

By processing in this manner, if there are two or more target RAID groups 340 to be recovered, all preceding recovery processing can be performed earlier. When all preceding recovery processing are completed, only one target RAID group 340 to be recovered is left, and the process proceeds to "NO" in S4020, and the calculation processing of the recovery start time of the recovery processing for RAID group 340 is performed.

Accordingly, the calculation of the recovery processing start time needs to be performed for only the last recovery processing, thus even if there are a plurality of target RAID groups 340 to be recovered, the calculation of recovery processing start time can be simplified. Also, if there are a plurality of recovery processing, those recovery processing can be performed at earlier times, thus data can be securely protected even if a failure occurs in the storage apparatus 300.

In the above description, an exemplary case has been described where when there are two or more target RAID groups 340 to be recovered, recovery processing for the RAID groups 340 is performed in the order according to the priorities set to the RAID groups 340. However, for example, respective latest recovery processing start times of the RAID groups may be considered. For example, if recovery processing of a RAID group 340 with a lower priority has to be performed before recovery processing of another RAID group 340 with a higher priority for the former RAID group 340 to meet the latest recovery processing time, the recovery processing of the RAID group 340 with a lower priority may be performed earlier.

Otherwise, if the CPU 331 has a high performance, or a load of data input and output processing to and from the host PC 100 is small, and there are two or more target RAID groups 340 to be recovered, recovery processing for them may be started immediately at the same time. In this manner, the recovery processing on standby can be completed in a short time.

Although preferred embodiments of the present invention have been described, these are for illustrative purposes to describe the present invention, and it is not intended to limit the scope of the present invention to those embodiments. The present invention may be implemented in various other embodiments.

The invention claimed is:
1. A storage apparatus comprising:
an I/O processing unit that receives a data input/output request sent from an information processing device communicatively coupled thereto, and performs reading and writing of data from and to a storage drive;
a priority storage unit that stores a priority set to each RAID group including the storage drive;
a failure information storage unit that acquires and stores information on a failure occurred in the storage drive;
a blockage processing unit that determines whether or not the storage drive is to be blocked based on the information on the failure, and blocks the storage drive that is determined to be blocked;
a start time calculation unit that calculates a start time for recovery processing to delete a fall-back state of the RAID group to which the blocked storage drive belongs according to the priority set to the RAID group; and
a recovery processing execution unit that starts the recovery processing at the start time;
wherein
the information on the failure is an accumulated number of occurrences of a failure in each of the storage drives;
the blockage processing unit determines whether or not to block the storage drives by comparing the accumulated number of occurrences with a pre-registered threshold;
the storage apparatus includes an operating time storage unit that stores an operating time of the storage drives from a start of use;
the start time calculation unit calculates a mean failure occurrence interval of the blocked storage drive belonging to the RAID group in the fall-back state based on the accumulated number of occurrences of a failure in the blocked storage drive and the operating time of the blocked storage drive;
the start time calculation unit compares the mean failure occurrence interval of the blocked storage drive with a mean failure occurrence interval calculated for the non-blocked storage drive belonging to the RAID group in the fall-back state based on the accumulated number of occurrences of a failure in the non-blocked storage drive and the operating time of the non-blocked storage drive, and uses the shorter mean failure occurrence interval as the mean failure occurrence interval of the non-blocked storage drives;
the start time calculation unit determines a time at which the non-blocked storage drives is expected to be blocked based on the mean failure occurrence interval of the non-blocked storage drive and the accumulated number of occurrences of a failure in the non-blocked storage drive;
the start time calculation unit determines the earliest expected time among the expected times of the non-blocked storage drives belonging to the RAID group as the estimated blockage time of the RAID group in a case where there are a plurality of the non-blocked storage drives;
the storage apparatus includes a recovery processing time storage unit that stores a recovery processing time period that is time required for the recovery processing;
the start time calculation unit determines the start time no later than a latest recovery processing start time that is time before the expected blockage time by the period of the recovery processing time, according to the priority set to the RAID group;
the storage apparatus includes an execution queue for recovery processing to which one or more of the recovery processing in an execution wait state is registered together with the start times respectively determined;
the start time of a recovery processing is calculated after completion of all other recovery processing already registered in the execution queue and the recovery processing is registered to the execution queue, when registering the recovery processing to the execution queue;
the recovery processing execution unit executes the other recovery processing sequentially, when executioning all the other recovery processing already registered in the execution queue,
the storage apparatus includes a priority processing unit that receives a change of the priority set to the RAID group;
the start time of the recovery processing of the RAID group that is registered to the execution queue is changed according to the priority, when the priority of a certain RAID group is changed;
the storage apparatus includes a load acquisition unit that acquires a load of hardware that implements a function of the I/O processing unit;
the recovery processing execution unit starts the recovery processing registered to the execution queue before the start time of the recovery processing arrives, when the load of the hardware is smaller than a preset threshold;

the recovery processing includes a processing that uses data stored in a non-blocked storage drive which belongs to the RAID group in the fall-back state to delete the fall-back state of the RAID group by recovering data of the blocked storage drive into a storage drive different from the non-blocked storage drive and the blocked storage drive; and the storage apparatus includes a priority processing unit being communicatively coupled to a management terminal including a priority setting processing unit that receives the priority set to the RAID group, and a priority transmitting unit that sends the received priority to the storage apparatus, and receiving the priority sent from the priority transmitting unit.

2. The storage apparatus according to claim 1, wherein the recovery processing includes a processing that uses data stored in a non-blocked storage drive which belongs to the RAID group in the fall-back state to delete the fall-back state of the RAID group, by recovering data of the blocked storage drive into a storage drive different from the non-blocked storage drive and the blocked storage drive.

3. The storage apparatus according to claim 1, wherein the information on the failure is an accumulated number of occurrences of a failure in each of the storage drives, and the blockage processing unit determines whether or not the storage drive is to be blocked by comparing the accumulated number of occurrences with a pre-registered threshold.

4. The storage apparatus according to claim 3, further comprising:
an operating time storage unit that stores an operating time of the storage drive from a start of use; and
a recovery processing time storage unit that stores a recovery processing time period required for the recovery processing, wherein
the start time calculation unit
determines an expected blockage time at which the RAID group is expected to be blocked based on the accumulated number of occurrences of a failure in the storage drive belonging to the RAID group in the fall-back state, and the operating time of the storage drive; and
determines the start time no later than a latest recovery processing start time that is time before the expected blockage time by the period of the recovery processing time, according to the priority set to the RAID group.

5. The storage apparatus according to claim 4, wherein the start time calculation unit
calculates a mean failure occurrence interval of the non-blocked storage drive belonging to the RAID group in the fall-back state based on the accumulated number of occurrences of a failure in the storage drive and the operating time of the storage drive;
determines a time at which the storage drive is expected to be blocked based on the mean failure occurrence interval of the storage drive and the accumulated number of occurrences of a failure in the storage drive; and
determines, as the expected blockage time, the earliest expected time among the expected times of the non-blocked storage drives belonging to the RAID group in a case where there are a plurality of the non-blocked storage drives.

6. The storage apparatus according to claim 4, wherein the start time calculation unit calculates a mean failure occurrence interval in the blocked storage drive belonging to the RAID group in the fall-back state based on the accumulated number of occurrences of a failure in the blocked storage drive and the operating time of the blocked storage drive;
compares the mean failure occurrence interval of the blocked storage drive with a mean failure occurrence interval calculated for a non-blocked storage drive belonging to the RAID group in the fall-back state based on the accumulated number of occurrences of a failure in the non-blocked storage drive and the operating time of the non-blocked storage drive, and uses the shorter mean failure occurrence interval as the mean failure occurrence interval of the non-blocked storage drive;
determines an expected time at which the non-blocked storage drive is to be blocked based on the mean failure occurrence interval of the non-blocked storage drive and the accumulated number of occurrences of a failure in the non-blocked storage drive; and
determines the earliest expected time among the expected times of the non-blocked storage drives belonging to the RAID group as the expected blockage time.

7. The storage apparatus according to claim 1, further comprising:
an execution queue for recovery processing to which one or more of the recovery processing in an execution wait state is registered together with the start times respectively determined, wherein
the start time of a recovery processing is calculated after completion of all the other recovery processing already registered in the execution queue and the recovery processing is registered to the execution queue, when registering the recovery processing to the execution queue.

8. The storage apparatus according to claim 7, wherein the recovery processing execution unit executes the other recovery processing sequentially, when executing all the other recovery processing already registered in the execution queue.

9. The storage apparatus according to claim 8, wherein the recovery processing execution unit executes the other recovery processing sequentially in an order determined by the priority set to each RAID group targeted by the recovery processing.

10. The storage apparatus according to claim 1, further comprising:
a priority processing unit that receives a change of the priority set to the RAID group; and
an execution queue for recovery processing to which one or more recovery processing in an execution wait state is registered together with the start times respectively determined, wherein
the start time of the recovery processing of the RAID group that is registered to the execution queue is changed according to the priority, when the priority of a certain RAID group is changed.

11. The storage apparatus according to claim 1, further comprising:
an execution queue for recovery processing to which one or more of the recovery processing in an execution wait state is registered together with the start times respectively determined; and
a load acquisition unit that acquires a load of hardware that implements a function of the I/O processing unit, wherein
the recovery processing execution unit starts the recovery processing registered to the execution queue before the start time of the recovery processing arrives, when the load of the hardware is smaller than a preset threshold.

12. The storage apparatus according to claim 1, further comprising:
a priority processing unit
being communicatively coupled to a management terminal including a priority setting processing unit that receives the priority set to the RAID group, and a priority transmitting unit that sends the received priority to the storage apparatus, and
receiving the priority sent from the priority transmitting unit.

13. A control method of a storage apparatus including an I/O processing unit that receives a data input/output request sent from an information processing device communicatively coupled thereto, and performs reading and writing of data from and to a storage drive, and a priority storage unit that stores a priority set to each RAID group including the storage drive, the method comprising:
acquiring, by the storage apparatus, information relating to a failure occurred in the storage drive;
determining, by the storage apparatus, whether or not the storage drive is to be blocked based on the information on the failure, and blocks the storage drive that is determined to be blocked;
calculating, by the storage apparatus, a start time for recovery processing to delete a fall-back state of the RAID group to which the blocked storage drive belongs according to the priority set to the RAID group; and
starting, by the storage apparatus, the recovery processing at the start time;
wherein
the information on the failure is an accumulated number of occurrences of a failure in each of the storage drives;
a blockage processing unit determines whether or not to block the storage drives by comparing the accumulated number of occurrences with a pre-registered threshold;
the storage apparatus includes an operating time storage unit that stores an operating time of the storage drives from a start of use;
a start time calculation unit calculates a mean failure occurrence interval of the blocked storage drive belonging to the RAID group in the fall-back state based on the accumulated number of occurrences of a failure in the blocked storage drive and the operating time of the blocked storage drive;
the start time calculation unit compares the mean failure occurrence interval of the blocked storage drive with a mean failure occurrence interval calculated for the non-blocked storage drive belonging to the RAID group in the fall-back state based on the accumulated number of occurrences of a failure in the non-blocked storage drive and the operating time of the non-blocked storage drive, and uses the shorter mean failure occurrence interval as the mean failure occurrence interval of the non-blocked storage drives;
the start time calculation unit determines a time at which the non-blocked storage drives is expected to be blocked based on the mean failure occurrence interval of the non-blocked storage drive and the accumulated number of occurrences of a failure in the non-blocked storage drive;
the start time calculation unit determines the earliest expected time among the expected times of the non-blocked storage drives belonging to the RAID group as the estimated blockage time of the RAID group in a case where there are a plurality of the non-blocked storage drives;
the storage apparatus includes a recovery processing time storage unit that stores a recovery processing time period that is time required for the recovery processing;
the start time calculation unit determines the start time no later than a latest recovery processing start time that is time before the expected blockage time by the period of the recovery processing time, according to the priority set to the RAID group;
the storage apparatus includes an execution queue for recovery processing to which one or more of the recovery processing in an execution wait state is registered together with the start times respectively determined;
the start time of a recovery processing is calculated after completion of all other recovery processing already registered in the execution queue and the recovery processing is registered to the execution queue, when registering the recovery processing to the execution queue;
a recovery processing execution unit executes the other recovery processing sequentially, when executioning all the other recovery processing already registered in the execution queue;
the storage apparatus includes a priority processing unit that receives a change of the priority set to the RAID group;
the start time of the recovery processing of the RAID group that is registered to the execution queue is changed according to the priority, when the priority of a certain RAID group is changed;
the storage apparatus includes a load acquisition unit that acquires a load of hardware that implements a function of the I/O processing unit;
the recovery processing execution unit starts the recovery processing registered to the execution queue before the start time of the recovery processing arrives, when the load of the hardware is smaller than a preset threshold;
the recovery processing includes a processing that uses data stored in a non-blocked storage drive which belongs to the RAID group in the fall-back state to delete the fall-back state of the RAID group by recovering data of the blocked storage drive into a storage drive different from the non-blocked storage drive and the blocked storage drive; and
the storage apparatus includes a priority processing unit being communicatively coupled to a management terminal including a priority setting processing unit that receives the priority set to the RAID group, and a priority transmitting unit that sends the received priority to the storage apparatus, and receiving the priority sent from the priority transmitting unit.

* * * * *